United States Patent
Dundar et al.

(10) Patent No.: US 12,411,650 B2
(45) Date of Patent: Sep. 9, 2025

(54) GENERATING A CUSTOMIZED SOCIAL-DRIVEN PLAYLIST

(71) Applicant: Apple Inc., Cupertino, CA (US)

(72) Inventors: Bekir B. Dundar, Moraga, CA (US); Arvind S. Shenoy, San Jose, CA (US); Daniel Cartoon, South San Francisco, CA (US); Denise L. Chen, Menlo Park, CA (US); Drew R. Domm, Oakland, CA (US); Fredric R. Vinna, San Francisco, CA (US); Mark H. Levy, Winchester (GB); Paul C. Irvine, Mill Valley, CA (US); Priyo Mustafi, Fremont, CA (US); Thomas Alsina, Saratoga, CA (US); Erik Lindholm, Cupertino, CA (US); Uli M. Schoberl, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/182,667

(22) Filed: Mar. 13, 2023

(65) Prior Publication Data

US 2023/0333808 A1    Oct. 19, 2023

Related U.S. Application Data

(63) Continuation of application No. 16/454,668, filed on Jun. 27, 2019, now abandoned.
(Continued)

(51) Int. Cl.
*G06F 3/16* (2006.01)
*G06F 3/0482* (2013.01)
(Continued)

(52) U.S. Cl.
CPC ............ *G06F 3/165* (2013.01); *G06F 3/0482* (2013.01); *G06F 16/24578* (2019.01);
(Continued)

(58) Field of Classification Search
CPC .. G06F 3/165; G06F 16/24578; G06F 16/639; G06F 3/0482; H04L 67/22; H04L 67/306
See application file for complete search history.

(56) References Cited

U.S. PATENT DOCUMENTS

| 4,607,385 A | 8/1986 | Maeda |
| 4,996,642 A | 2/1991 | Hey |

(Continued)

FOREIGN PATENT DOCUMENTS

| EP | 0643359 A2 | 3/1995 |
| EP | 1050833 A2 | 11/2000 |

(Continued)

OTHER PUBLICATIONS

Pampalk, et al., "Content-based Organization and Visualization of Music Archives," ACM Multimedia, Juan les Pins, France, Dec. 2002, pp. 570-579.
(Continued)

*Primary Examiner* — James T Tsai
(74) *Attorney, Agent, or Firm* — Blank Rome LLP

(57) ABSTRACT

Generating a customized playlist may include identifying a user account for which a playlist is to be generated, where the user account is associated with a user listening history, a taste profile, and a social profile, identifying one or more friend accounts linked to the user account based on the social profile, obtaining an indication of a plurality of songs associated with one or more of the friend accounts, determining a listening history for the one or more plurality of songs based on the friend accounts, obtaining a subset of the plurality of songs based on the listening history of the
(Continued)

plurality of songs, and generating a playlist from the subset of the plurality of songs.

17 Claims, 10 Drawing Sheets

Related U.S. Application Data

(60) Provisional application No. 62/690,705, filed on Jun. 27, 2018.

(51) Int. Cl.
*G06F 16/2457* (2019.01)
*G06F 16/638* (2019.01)
*H04L 67/306* (2022.01)
*H04L 67/50* (2022.01)

(52) U.S. Cl.
CPC .......... *G06F 16/639* (2019.01); *H04L 67/306* (2013.01); *H04L 67/535* (2022.05)

(56) References Cited

U.S. PATENT DOCUMENTS

| | | |
|---|---|---|
| 5,355,302 A | 10/1994 | Martin |
| 5,375,235 A | 12/1994 | Berry |
| 5,464,946 A | 11/1995 | Lewis |
| 5,483,278 A | 1/1996 | Strubbe |
| 5,583,763 A | 12/1996 | Atcheson |
| 5,616,876 A | 4/1997 | Cluts |
| 5,724,521 A | 3/1998 | Dedrick |
| 5,754,939 A | 5/1998 | Herz |
| 5,758,257 A | 5/1998 | Herz |
| 5,765,144 A | 6/1998 | Larche |
| 5,835,087 A | 11/1998 | Herz |
| 5,890,152 A | 3/1999 | Rapaport |
| 5,918,014 A | 6/1999 | Robinson |
| 5,926,624 A | 7/1999 | Katz |
| 5,931,454 A | 8/1999 | Kondo |
| 5,950,176 A | 9/1999 | Keiser |
| 6,000,044 A | 12/1999 | Chrysos |
| 6,041,311 A | 3/2000 | Chislenko |
| 6,047,311 A | 4/2000 | Ueno |
| 6,112,186 A | 8/2000 | Bergh |
| 6,134,532 A | 10/2000 | Lazarus |
| 6,266,649 B1 | 7/2001 | Linden et al. |
| 6,289,353 B1 | 9/2001 | Hazlehurst et al. |
| 6,317,722 B1 | 11/2001 | Jacobi et al. |
| 6,345,288 B1 | 2/2002 | Reed |
| 6,346,951 B1 | 2/2002 | Mastronardi |
| 6,347,313 B1 | 2/2002 | Ma |
| 6,349,339 B1 | 2/2002 | Williams |
| 6,381,575 B1 | 4/2002 | Martin |
| 6,430,539 B1 | 8/2002 | Lazarus |
| 6,434,621 B1 | 8/2002 | Pezzillo |
| 6,438,579 B1 | 8/2002 | Hosken |
| 6,487,539 B1 | 11/2002 | Aggarwal |
| 6,526,411 B1 | 2/2003 | Ward |
| 6,532,469 B1 | 3/2003 | Feldman |
| 6,545,209 B1 | 4/2003 | Flannery |
| 6,577,716 B1 | 6/2003 | Minter |
| 6,587,127 B1 | 7/2003 | Leeke |
| 6,615,208 B1 | 9/2003 | Behrens |
| 6,647,371 B2 | 11/2003 | Shinohara |
| 6,687,696 B2 | 2/2004 | Hofmann |
| 6,690,918 B2 | 2/2004 | Evans |
| 6,704,576 B1 | 3/2004 | Brachman |
| 6,727,914 B1 | 4/2004 | Gutta |
| 6,748,395 B1 | 6/2004 | Picker |
| 6,751,574 B2 | 6/2004 | Shinohara |
| 6,785,688 B2 | 8/2004 | Abajian |
| 6,842,748 B1 | 1/2005 | Warner |
| 6,842,761 B2 | 1/2005 | Diamond |
| 6,850,252 B1 | 2/2005 | Hoffberg |
| 6,865,546 B1 | 3/2005 | Song |
| 6,914,891 B2 | 7/2005 | Ha |
| 6,931,454 B2 | 8/2005 | Deshpande |
| 6,933,433 B1 | 8/2005 | Porteus |
| 6,941,324 B2 | 9/2005 | Plastina |
| 6,947,922 B1 | 9/2005 | Glance |
| 6,950,804 B2 | 9/2005 | Strietzel |
| 6,987,221 B2 | 1/2006 | Platt |
| 6,990,497 B2 | 1/2006 | Orourke |
| 6,993,532 B1 | 1/2006 | Platt |
| 7,013,238 B1 | 3/2006 | Weare |
| 7,020,637 B2 | 3/2006 | Bratton |
| 7,021,836 B2 | 4/2006 | Anderson |
| 7,024,424 B1 | 4/2006 | Platt |
| 7,043,479 B2 | 5/2006 | Ireton |
| 7,051,352 B1 | 5/2006 | Schaffer |
| 7,072,846 B1 | 7/2006 | Robinson |
| 7,082,407 B1 | 7/2006 | Bezos |
| 7,096,234 B2 | 8/2006 | Plastina |
| 7,111,240 B2 | 9/2006 | Crow |
| 7,113,917 B2 | 9/2006 | Jacobi |
| 7,113,999 B2 | 9/2006 | Pestoni |
| 7,117,516 B2 | 10/2006 | Khoo |
| 7,120,619 B2 | 10/2006 | Drucker |
| 7,127,143 B2 | 10/2006 | Elkinsii |
| 7,133,924 B1 | 11/2006 | Rosenberg |
| 7,136,866 B2 | 11/2006 | Springer, Jr. |
| 7,139,723 B2 | 11/2006 | Conkwright |
| 7,159,000 B2 | 1/2007 | Plastina |
| 7,174,126 B2 | 2/2007 | McElhatten |
| 7,180,473 B2 | 2/2007 | Horie |
| 7,194,421 B2 | 3/2007 | Conkwright |
| 7,196,258 B2 | 3/2007 | Platt |
| 7,197,472 B2 | 3/2007 | Conkwright |
| 7,224,282 B2 | 5/2007 | Terauchi |
| 7,228,054 B2 | 6/2007 | Cowgill |
| 7,236,941 B2 | 6/2007 | Conkwright |
| 7,246,041 B2 | 7/2007 | Fukuda |
| 7,256,341 B2 | 8/2007 | Plastina |
| 7,277,870 B2 | 10/2007 | Mourad |
| 7,296,031 B1 | 11/2007 | Platt |
| 7,302,419 B2 | 11/2007 | Conkwright |
| 7,302,468 B2 | 11/2007 | Wijeratne |
| 7,340,455 B2 | 3/2008 | Platt |
| 7,345,232 B2 | 3/2008 | Toivonen |
| 7,358,434 B2 | 4/2008 | Plastina |
| 7,363,314 B2 | 4/2008 | Picker |
| 7,392,212 B2 | 6/2008 | Hancock |
| 7,403,769 B2 | 7/2008 | Kopra |
| 7,415,181 B2 | 8/2008 | Greenwood |
| 7,434,247 B2 | 10/2008 | Dudkiewicz |
| 7,457,852 B2 | 11/2008 | Orourke |
| 7,457,862 B2 | 11/2008 | Hepworth |
| 7,478,323 B2 | 1/2009 | Dowdy |
| 7,487,107 B2 | 2/2009 | Blanchard |
| 7,490,775 B2 | 2/2009 | Biderman |
| 7,493,572 B2 | 2/2009 | Card |
| 7,499,630 B2 | 3/2009 | Koch |
| 7,505,959 B2 | 3/2009 | Kaiser |
| 7,546,254 B2 | 6/2009 | Bednarek |
| 7,568,213 B2 | 7/2009 | Carhart |
| 7,571,121 B2 | 8/2009 | Bezos |
| 7,571,183 B2 | 8/2009 | Renshaw |
| 7,574,422 B2 | 8/2009 | Guan |
| 7,574,513 B2 | 8/2009 | Dunning |
| 7,580,932 B2 | 8/2009 | Plastina |
| 7,585,204 B2 | 9/2009 | Kobayashi |
| 7,599,847 B2 | 10/2009 | Block |
| 7,599,906 B2 | 10/2009 | Kashiwagi |
| 7,599,950 B2 | 10/2009 | Walther |
| 7,644,077 B2 | 1/2010 | Picker |
| 7,647,613 B2 | 1/2010 | Drakoulis |
| 7,650,570 B2 | 1/2010 | Torrens |
| 7,653,761 B2 | 1/2010 | Juster |
| 7,657,224 B2 | 2/2010 | Goldberg |
| 7,657,493 B2 | 2/2010 | Meijer |
| 7,680,849 B2 | 3/2010 | Heller |
| 7,680,959 B2 | 3/2010 | Svendsen |
| 7,685,204 B2 | 3/2010 | Rogers |

(56) References Cited

U.S. PATENT DOCUMENTS

| | | | |
|---|---|---|---|
| 7,693,887 B2 | 4/2010 | McLaughlin | |
| 7,707,603 B2 | 4/2010 | Abanami | |
| 7,720,871 B2 | 5/2010 | Rogers | |
| 7,725,494 B2 | 5/2010 | Rogers | |
| 7,734,569 B2 | 6/2010 | Martin | |
| 7,743,009 B2 | 6/2010 | Hangartner | |
| 7,797,321 B2 | 9/2010 | Martin | |
| 7,797,446 B2 | 9/2010 | Heller | |
| 7,801,758 B2 | 9/2010 | Gracie | |
| 7,826,444 B2 | 11/2010 | Irvin | |
| 7,831,199 B2 | 11/2010 | Ng | |
| 7,840,570 B2 | 11/2010 | Martin Cervera | |
| 7,853,712 B2 | 12/2010 | Amidon | |
| 7,875,788 B2 | 1/2011 | Benyamin | |
| 7,889,724 B2 | 2/2011 | Irvin | |
| 8,260,656 B1 | 9/2012 | Harbick | |
| 8,626,607 B1 | 1/2014 | Wood | |
| 8,639,706 B1* | 1/2014 | Bilinski | G06F 16/285 707/752 |
| 8,655,464 B2 | 2/2014 | Dollar, Jr. | |
| 9,131,018 B2 | 9/2015 | Robertson | |
| 9,269,107 B2 | 2/2016 | Boulter | |
| 9,495,447 B1 | 11/2016 | Phillips | |
| 9,720,564 B1 | 8/2017 | Vinna | |
| 9,870,360 B1 | 1/2018 | Bilinski | |
| 10,262,060 B1 | 4/2019 | Zeiler | |
| 10,853,826 B2* | 12/2020 | Romagnolo | G06Q 30/0203 |
| 2001/0007099 A1 | 7/2001 | Rau | |
| 2001/0021914 A1 | 9/2001 | Jacobi | |
| 2001/0056434 A1 | 12/2001 | Kaplan | |
| 2002/0002899 A1 | 1/2002 | Gjerdingen | |
| 2002/0042912 A1 | 4/2002 | Iijima | |
| 2002/0045960 A1 | 4/2002 | Phillips | |
| 2002/0059094 A1 | 5/2002 | Hosea | |
| 2002/0082901 A1 | 6/2002 | Dunning | |
| 2002/0087970 A1 | 7/2002 | Dorricott | |
| 2002/0152117 A1 | 10/2002 | Cristofalo | |
| 2002/0178223 A1 | 11/2002 | Bushkin | |
| 2002/0178276 A1 | 11/2002 | McCartney | |
| 2002/0194215 A1 | 12/2002 | Cantrell | |
| 2003/0018709 A1 | 1/2003 | Schrempp | |
| 2003/0022953 A1 | 1/2003 | Zampini | |
| 2003/0033321 A1 | 2/2003 | Schrempp | |
| 2003/0055689 A1 | 3/2003 | Block | |
| 2003/0097379 A1 | 5/2003 | Ireton | |
| 2003/0120630 A1 | 6/2003 | Tunkelang | |
| 2003/0135513 A1 | 7/2003 | Quinn | |
| 2003/0212710 A1 | 11/2003 | Guy | |
| 2003/0221541 A1 | 12/2003 | Platt | |
| 2003/0229537 A1 | 12/2003 | Dunning | |
| 2004/0002993 A1 | 1/2004 | Toussaint | |
| 2004/0003392 A1 | 1/2004 | Trajkovic | |
| 2004/0055445 A1 | 3/2004 | Iyoku | |
| 2004/0068552 A1 | 4/2004 | Kotz | |
| 2004/0070538 A1 | 4/2004 | Horie | |
| 2004/0073924 A1 | 4/2004 | Pendakur | |
| 2004/0128286 A1 | 7/2004 | Yasushi | |
| 2004/0139064 A1 | 7/2004 | Chevallier | |
| 2004/0148424 A1 | 7/2004 | Berkson | |
| 2004/0158860 A1 | 8/2004 | Crow | |
| 2004/0162738 A1 | 8/2004 | Sanders | |
| 2004/0194128 A1 | 9/2004 | McIntyre | |
| 2004/0215657 A1 | 10/2004 | Drucker | |
| 2004/0252604 A1 | 12/2004 | Johnson | |
| 2004/0254659 A1 | 12/2004 | Bolas | |
| 2004/0263337 A1 | 12/2004 | Terauchi | |
| 2004/0267715 A1 | 12/2004 | Polson | |
| 2005/0004941 A1 | 1/2005 | Maria Kalker | |
| 2005/0019114 A1 | 1/2005 | Sung | |
| 2005/0021470 A1 | 1/2005 | Martin | |
| 2005/0038819 A1 | 2/2005 | Hicken | |
| 2005/0050079 A1 | 3/2005 | Plastina | |
| 2005/0060350 A1 | 3/2005 | Baum | |
| 2005/0075908 A1 | 4/2005 | Stevens | |
| 2005/0091146 A1 | 4/2005 | Levinson | |
| 2005/0091147 A1 | 4/2005 | Ingargiola | |
| 2005/0098023 A1 | 5/2005 | Toivonen | |
| 2005/0102610 A1 | 5/2005 | Jie | |
| 2005/0114357 A1 | 5/2005 | Chengalvarayan | |
| 2005/0131752 A1 | 6/2005 | Gracie | |
| 2005/0141709 A1 | 6/2005 | Bratton | |
| 2005/0154608 A1 | 7/2005 | Paulson | |
| 2005/0160458 A1 | 7/2005 | Baumgartner | |
| 2005/0193014 A1 | 9/2005 | Prince | |
| 2005/0193054 A1 | 9/2005 | Wilson | |
| 2005/0195696 A1 | 9/2005 | Rekimoto | |
| 2005/0198075 A1 | 9/2005 | Plastina | |
| 2005/0203807 A1 | 9/2005 | Bezos | |
| 2005/0210009 A1 | 9/2005 | Tran | |
| 2005/0210101 A1 | 9/2005 | Janik | |
| 2005/0210507 A1 | 9/2005 | Hawkins | |
| 2005/0216855 A1 | 9/2005 | Kopra | |
| 2005/0216859 A1 | 9/2005 | Paek | |
| 2005/0222989 A1 | 10/2005 | Haveliwala | |
| 2005/0223039 A1 | 10/2005 | Kim | |
| 2005/0234891 A1 | 10/2005 | Walther | |
| 2005/0235811 A1 | 10/2005 | Dukane | |
| 2005/0240494 A1 | 10/2005 | Cue | |
| 2005/0251440 A1 | 11/2005 | Bednarek | |
| 2005/0256867 A1 | 11/2005 | Walther | |
| 2005/0276570 A1 | 12/2005 | Reed | |
| 2005/0278377 A1 | 12/2005 | Mirrashidi | |
| 2006/0015571 A1 | 1/2006 | Fukuda | |
| 2006/0015904 A1 | 1/2006 | Marcus | |
| 2006/0018208 A1 | 1/2006 | Nathan | |
| 2006/0018209 A1 | 1/2006 | Drakoulis | |
| 2006/0020062 A1 | 1/2006 | Bloom | |
| 2006/0020662 A1 | 1/2006 | Robinson | |
| 2006/0026263 A1 | 2/2006 | Raghavan | |
| 2006/0032363 A1 | 2/2006 | Platt | |
| 2006/0053077 A1 | 3/2006 | Mourad | |
| 2006/0059225 A1 | 3/2006 | Stonehocker | |
| 2006/0062094 A1 | 3/2006 | Nathan | |
| 2006/0067296 A1 | 3/2006 | Bershad | |
| 2006/0074750 A1 | 4/2006 | Clark | |
| 2006/0080251 A1 | 4/2006 | Fried | |
| 2006/0080356 A1 | 4/2006 | Burges | |
| 2006/0091203 A1 | 5/2006 | Bakker | |
| 2006/0095516 A1 | 5/2006 | Wijeratne | |
| 2006/0100978 A1 | 5/2006 | Heller | |
| 2006/0107823 A1 | 5/2006 | Platt | |
| 2006/0112098 A1 | 5/2006 | Renshaw | |
| 2006/0123052 A1 | 6/2006 | Robbin | |
| 2006/0136344 A1 | 6/2006 | Jones | |
| 2006/0143236 A1 | 6/2006 | Wu | |
| 2006/0153040 A1 | 7/2006 | Girish | |
| 2006/0155754 A1 | 7/2006 | Lubin | |
| 2006/0156239 A1 | 7/2006 | Jobs | |
| 2006/0165571 A1 | 7/2006 | Seon | |
| 2006/0168340 A1 | 7/2006 | Heller | |
| 2006/0168616 A1 | 7/2006 | Candelore | |
| 2006/0171682 A1 | 8/2006 | Komano | |
| 2006/0173910 A1 | 8/2006 | McLaughlin | |
| 2006/0173916 A1 | 8/2006 | Sibley | |
| 2006/0174008 A1 | 8/2006 | Abanami | |
| 2006/0195462 A1* | 8/2006 | Rogers | G06Q 20/1235 707/999.005 |
| 2006/0195512 A1 | 8/2006 | Rogers | |
| 2006/0195513 A1 | 8/2006 | Rogers | |
| 2006/0195514 A1 | 8/2006 | Rogers | |
| 2006/0195515 A1 | 8/2006 | Beaupre | |
| 2006/0195516 A1 | 8/2006 | Beaupre | |
| 2006/0195521 A1 | 8/2006 | New | |
| 2006/0195789 A1 | 8/2006 | Rogers | |
| 2006/0195790 A1 | 8/2006 | Beaupre | |
| 2006/0204220 A1 | 9/2006 | Lee | |
| 2006/0206478 A1 | 9/2006 | Glaser | |
| 2006/0253874 A1 | 11/2006 | Stark | |
| 2006/0265421 A1 | 11/2006 | Ranasinghe | |
| 2006/0277098 A1 | 12/2006 | Chung | |
| 2006/0282304 A1 | 12/2006 | Bedard | |
| 2006/0282311 A1 | 12/2006 | Jiang | |
| 2006/0288367 A1 | 12/2006 | Swix | |
| 2007/0014536 A1 | 1/2007 | Hellman | |

(56) References Cited

U.S. PATENT DOCUMENTS

| | | |
|---|---|---|
| 2007/0016507 A1 | 1/2007 | Tzara |
| 2007/0043829 A1 | 2/2007 | Dua |
| 2007/0073596 A1 | 3/2007 | Alexander |
| 2007/0100690 A1 | 5/2007 | Hopkins |
| 2007/0101373 A1 | 5/2007 | Bodlanender |
| 2007/0118546 A1 | 5/2007 | Acharya |
| 2007/0136264 A1 | 6/2007 | Tran |
| 2007/0156677 A1 | 7/2007 | Szabo |
| 2007/0156732 A1 | 7/2007 | Surendran |
| 2007/0161402 A1 | 7/2007 | Ng |
| 2007/0162502 A1 | 7/2007 | Thomas |
| 2007/0162546 A1 | 7/2007 | McLaughlin |
| 2007/0165577 A1 | 7/2007 | Baker |
| 2007/0174866 A1 | 7/2007 | Brown |
| 2007/0183742 A1 | 8/2007 | Cowgill |
| 2007/0203790 A1 | 8/2007 | Torrens |
| 2007/0219996 A1 | 9/2007 | Jarvinen |
| 2007/0220566 A1 | 9/2007 | Ahmad-Taylor |
| 2007/0244880 A1 | 10/2007 | Martin |
| 2007/0250429 A1 | 10/2007 | Walser |
| 2007/0250761 A1 | 10/2007 | Bradley |
| 2007/0265979 A1 | 11/2007 | Hangartner |
| 2007/0271286 A1 | 11/2007 | Purang |
| 2007/0271287 A1 | 11/2007 | Acharya |
| 2007/0294096 A1 | 12/2007 | Randall |
| 2008/0004948 A1 | 1/2008 | Flake |
| 2008/0004990 A1 | 1/2008 | Flake |
| 2008/0010266 A1 | 1/2008 | Brunn |
| 2008/0021851 A1 | 1/2008 | Alcalde |
| 2008/0027881 A1 | 1/2008 | Bisse |
| 2008/0033979 A1 | 2/2008 | Vignoli |
| 2008/0040326 A1 | 2/2008 | Chang |
| 2008/0046317 A1 | 2/2008 | Christianson |
| 2008/0065659 A1 | 3/2008 | Watanabe |
| 2008/0077264 A1 | 3/2008 | Irvin |
| 2008/0082467 A1 | 4/2008 | Meijer |
| 2008/0091717 A1 | 4/2008 | Garbow |
| 2008/0109378 A1 | 5/2008 | Papadimitriou |
| 2008/0115173 A1 | 5/2008 | Ellis |
| 2008/0120339 A1 | 5/2008 | Guan |
| 2008/0126384 A1 | 5/2008 | Toms |
| 2008/0133593 A1 | 6/2008 | Clark |
| 2008/0133601 A1 | 6/2008 | Cervera |
| 2008/0133737 A1 | 6/2008 | Fischer |
| 2008/0147711 A1 | 6/2008 | Spiegelman |
| 2008/0154942 A1 | 6/2008 | Tsai |
| 2008/0155057 A1 | 6/2008 | Khedouri |
| 2008/0155588 A1 | 6/2008 | Roberts |
| 2008/0168059 A1 | 7/2008 | Hoashi |
| 2008/0195438 A1 | 8/2008 | Manfredi |
| 2008/0215173 A1 | 9/2008 | Hicken |
| 2008/0220855 A1 | 9/2008 | Chen |
| 2008/0250067 A1 | 10/2008 | Svendsen |
| 2008/0256106 A1 | 10/2008 | Whitman |
| 2008/0270221 A1 | 10/2008 | Clemens |
| 2009/0006353 A1 | 1/2009 | Vignoli |
| 2009/0024504 A1 | 1/2009 | Lerman |
| 2009/0024510 A1 | 1/2009 | Chen |
| 2009/0043811 A1 | 2/2009 | Yamamoto |
| 2009/0048957 A1 | 2/2009 | Celano |
| 2009/0055426 A1 | 2/2009 | Kalasapur |
| 2009/0063414 A1 | 3/2009 | White |
| 2009/0070267 A9 | 3/2009 | Hangartner |
| 2009/0073174 A1 | 3/2009 | Berg |
| 2009/0076939 A1 | 3/2009 | Berg |
| 2009/0076974 A1 | 3/2009 | Berg |
| 2009/0083307 A1 | 3/2009 | Cervera |
| 2009/0089222 A1 | 4/2009 | Castro |
| 2009/0106085 A1 | 4/2009 | Raimbeault |
| 2009/0164641 A1 | 6/2009 | Rogers |
| 2009/0210415 A1 | 8/2009 | Martin |
| 2009/0276368 A1 | 11/2009 | Martin |
| 2009/0276709 A1 | 11/2009 | Venneman |
| 2010/0011388 A1 | 1/2010 | Bull |
| 2010/0161595 A1 | 6/2010 | Martin |
| 2010/0169328 A1 | 7/2010 | Hangartner |
| 2010/0188405 A1 | 7/2010 | Haughay, Jr. |
| 2011/0016120 A1 | 1/2011 | Haughay, Jr. |
| 2011/0060738 A1 | 3/2011 | Gates |
| 2011/0119127 A1 | 5/2011 | Hangartner |
| 2011/0246508 A1 | 10/2011 | Maekawa |
| 2011/0295843 A1 | 12/2011 | Ingrassia |
| 2012/0030230 A1 | 2/2012 | Sheinkop |
| 2012/0041967 A1 | 2/2012 | Askey |
| 2012/0054666 A1 | 3/2012 | Baird-Smith |
| 2012/0290648 A1 | 11/2012 | Sharkey |
| 2013/0275353 A1 | 10/2013 | Ingrassia, Jr. et al. |
| 2014/0025702 A1* | 1/2014 | Curtiss ................ G06Q 30/02 707/769 |
| 2014/0122477 A1 | 5/2014 | McFarlane |
| 2014/0223099 A1 | 8/2014 | Kidron |
| 2014/0230631 A1 | 8/2014 | Wieder |
| 2014/0237361 A1 | 8/2014 | Martin |
| 2014/0280181 A1 | 9/2014 | Rodger |
| 2014/0282772 A1 | 9/2014 | Chen |
| 2015/0033292 A1 | 1/2015 | Nguyen |
| 2015/0039620 A1 | 2/2015 | Ning |
| 2015/0039644 A1 | 2/2015 | Trivedi |
| 2015/0089517 A1* | 3/2015 | Ruffini ............... H04N 21/4826 725/9 |
| 2015/0106320 A1 | 4/2015 | Boulter |
| 2015/0153910 A1 | 6/2015 | Wheeler |
| 2015/0193192 A1 | 7/2015 | Kidron |
| 2015/0268800 A1 | 9/2015 | O'Konski |
| 2015/0309768 A1 | 10/2015 | Van Der Heide |
| 2015/0331940 A1* | 11/2015 | Manning ............ G06F 16/4387 707/740 |
| 2016/0066038 A1 | 3/2016 | Chesluk |
| 2016/0162125 A1 | 6/2016 | Martella |
| 2016/0196345 A1 | 7/2016 | Kreifeldt |
| 2016/0292269 A1 | 10/2016 | O'Driscoll |
| 2016/0299906 A1 | 10/2016 | Cartoon |
| 2016/0335266 A1 | 11/2016 | Ogle |
| 2016/0360271 A1 | 12/2016 | Magahern |
| 2017/0092247 A1 | 3/2017 | Silverstein |
| 2017/0161273 A1 | 6/2017 | Cao |
| 2017/0161702 A1 | 6/2017 | Wood |
| 2018/0015369 A1* | 1/2018 | Schupak ............... G06T 11/206 |
| 2018/0097932 A1* | 4/2018 | Cohen ................. H04M 7/0033 |
| 2018/0157745 A1 | 6/2018 | Williams |
| 2018/0183739 A1 | 6/2018 | Foerster |
| 2018/0189306 A1 | 7/2018 | Lamere |
| 2018/0256078 A1 | 9/2018 | Vaterlaus |
| 2018/0349011 A1 | 12/2018 | Morag |
| 2019/0306105 A1* | 10/2019 | Snibbe ................. G10L 25/63 |
| 2019/0325035 A1* | 10/2019 | Sagui ................ G06F 16/4387 |

FOREIGN PATENT DOCUMENTS

| | | |
|---|---|---|
| EP | 1231788 A1 | 8/2002 |
| EP | 1420388 A1 | 5/2004 |
| EP | 1548741 A1 | 6/2005 |
| EP | 1906320 A1 | 4/2008 |
| EP | 2161668 A1 | 3/2010 |
| EP | 2306344 A1 | 4/2011 |
| JP | H1152965 A | 2/1999 |
| JP | 2002108351 A | 4/2002 |
| JP | 2002320203 A | 10/2002 |
| JP | 2003255958 A | 9/2003 |
| JP | 2004221999 A | 8/2004 |
| JP | 2005027337 A | 1/2005 |
| JP | 2008165759 A | 7/2008 |
| JP | 2009048706 A | 3/2009 |
| KR | 20020025579 A | 4/2002 |
| WO | 0017793 A1 | 3/2000 |
| WO | 2003019560 A2 | 3/2003 |
| WO | 2003036541 A1 | 5/2003 |
| WO | 2003051051 A1 | 6/2003 |
| WO | 2004070538 A2 | 8/2004 |
| WO | 2005013114 A1 | 2/2005 |
| WO | 2005038666 A1 | 4/2005 |
| WO | 2005046252 A3 | 5/2005 |
| WO | 2005071569 A1 | 8/2005 |
| WO | 2005106877 A1 | 11/2005 |

(56) References Cited

FOREIGN PATENT DOCUMENTS

| | | | |
|---|---|---|---|
| WO | 2005115107 A2 | 12/2005 |
| WO | 2006040710 A1 | 4/2006 |
| WO | 2006052837 A2 | 5/2006 |
| WO | 2006075032 A1 | 7/2006 |
| WO | 2006096664 A2 | 9/2006 |
| WO | 2006097795 A3 | 9/2006 |
| WO | 2006114451 A1 | 11/2006 |
| WO | 2007038806 A2 | 4/2007 |
| WO | 2007075622 A2 | 7/2007 |
| WO | 2007092053 A1 | 8/2007 |
| WO | 2007134193 A2 | 11/2007 |
| WO | 2009149046 A1 | 12/2009 |

OTHER PUBLICATIONS

Pauws, et al., "PATS: Realization and User Evaluation of an Automatic Playlist Generator," The International Conferences on Music Information Retrieval and Related Activities (ISMIR 2002), Paris, France, Oct. 2002,9 pages.

Platt, et al., 'Learning a Gaussian Process Prior for Automatically Generating Music Playlists,' Microsoft Corporation {platt, cburgess, sswenson, chriswea}@microsoft.com, alcez@cs.berkeley.edu, pp. 1-9.

Platt, John C., 'Fast Embedding of Sparse Music Similarity Graphs,' Microsoft Corporation, {jplatt@microsoft.com}.

Porter, Dave, "Digital Music Sales Triple to $1.1 Billion in 2005" www.axcessnews.com/modules/wfsection/article.php?articleid=8327, Web Page, Feb. 24, 2006, Maintenance Fees.

Ragno et al., "Inferring Similarity Between Music Objects with Application to Playlist Generation," MIR'05, Nov. 10-11, 2005, Singapore, pp. 73-80.

Rauber, et al., "The SOM-enhanced JukeBox: Organization and Visualization of Music Collections Based on Perceptual Models," Journal of New Music Research, vol. 32, Nov. 2, 2003, pp. 193-210.

S. Baluja, R. Seth, D. Sivakumar, Y. Jing, J. Yagnik, S. Kumar, D. Ravichandran, and M. Aly, "Video Suggestion and Discovery for YouTube: Taking Random Walks Through the View Graph," In WWW '08: Proceedings of the 17th international conference on World Wide Web, pp. 895-904, Beijing, China, 2008. ACM Press.

Scheible, et al., "MobiLenin—Combining A Multi-Track Music Video, Personal Mobile Phones and a Public Display into Multi-User Interactive Entertainment," Media Lab, University of Art and Design, Helsinki, Finland, pp. 1-10, Nov. 6-10, 2005.

Shneiderman, Ben, "Tree Visualization with Tree-Maps: 2-d Space-Filling Approach," ACM Transactions on Graphics, vol. 11, No. 1, Jan. 1992, pp. 92-99.

Shneiderman, Ben, "Treemaps for Space-Contrained Visualization of Hierarchies," http://www.sc.umd.edutheil/treemaphistory!, last updated Apr. 28, 2006, 16 pages.

Smart Computing, 'The Scoop on File-Sharing Services,' Dec. 2000, vol. 11, Issue 12; pp. 30-33 in printed issue. Available at www.smartcomputing.com/editorial/article.asp?article=articles%2F2000%Fs11-12.degree./02F08s12.asp.

Steffen Pauws and Berry Eggen, "Realization and User Evaluation of an Automatic Playlist Generator," Journal New Music Research, 2003, vol. 32, No. 2, pp. 179-192.

Strands Business Solutions. 'Integration Document v.2.0,' Published May 2008, [online retrieved on Jan. 21, 2010] Retrieved from the internet <URL: http://recommender.strands.comfdocfSBS-Integration-Docurnent.pdf>, entire document—18 pages.

T. Hofmann. 'Latent Semantic Models for Collaborative Filtering'. ACM Transactions on Information Systems, 22:89-115, 2004.

T. Hofmann. 'Unsupervised Learning by Probabilistic Latent Semantic Analysis'. Mach. Learn., 42:177-196, 2001.

Teng et al., "Design and Evaluation of mProducer: a Mobile Authoring Tool for Personal Experience Computing," [online], MUM 2004, College Park, Maryland, USA, Oct. 27-29, 2004 [retrieved on Dec. 17, 2010]. [http://citeseerx.ist.psu.edu/viewdocidownload?doi=10.1.1.131.2933&rep=re-p1&type=pdf].

Tom Bunzel, 'Easy Digital Music,' QUE Publisher, Aug. 18, 2004, Chapters 5 and 8.

Treemap, University of Maryland, http://www.cs.umd.edu/hcil/treemap/, last udpated Aug. 5, 2003, 4 pages.

Trustees of Indiana University, Variations2, The Indiana University Digital Music Library, http://dmi.indiana.edu/, last updated May 11, 2005.

Tzanetakis, et al., "MARSYAS3D: A Prototype Audio Browser-Editor Using a Large Scale Immersive Visual and Audio Display," Proceedings of the 2001 International Conference on Auditory Display, Espoo, Finland, Jul./Aug. 2001, 5 pages.

Wolfers, Justin and Zitzewitz, Eric, "Prediction Markets," Journal of Economic Perspectives, Spring 2004, pp. 107-126, vol. 18, No. 2.

www.akoo.com/Akoo/, Web Page, AKOO, Pick the Music, Waiting in the line at the Theme Park, Introducing the m-Venue.TM. platform.

www.ecastinc.com/music.sub.--licensing.html, Web Page, ECAST Network, interactive entertainment network, Music/Licensing.

www.roweinternational.com/jukeboxes.sub.--dia.html, Web Page, Digital Internet Access Jukeboxes, Rowe International.

www.touchtunes.com, Web Page, Touchtunes, Turn your ROWE 100A's and 100B's into touch tunes Digital Jukeboxes—Bose.

Y. Dempster, N. Laird, and D. Rubin. 'Maximum Likelihood from Incomplete Data via the EM Algorithm'. Jour. of the Royal Stat. Soc., Ser. B., 39:1047-1053, 1977.

Yates et al., "ShopSmart: Product Recommendations through Technical Specifications and User Reviews," Temple University, CIKM, Oct. 26-30, 2008, Napa Valley, CA, USA, 2 pages.

Yen, Yi-Wyn, "Apple announces a 32GB iPhone 3G by Jun. 15, 2009?," The Industry Standard, Apr. 2, 2009, http://www.thestandard.com/preditions/channel/hardware, downloaded Apr. 8, 2009.

'Communications of the ACM' Dec. 1992, vol. 35, No. 12 at pp. 26-28 (Introduction to special issue regarding Workshop on High Performance Information Filtering, Morristown, N.J. Nov. 1991).

'New Music Recommendation System is Based on FOAF Personal Profiling,' www.masternewmedia.org/music_recommendation/music_recommendation_system/FOAF, Oct. 1, 2005.

'Social Networking Meets Music Listening: Mecora Launches Radio 2.0,' www.masternewmedia.org/news/2006/04/13/sociaLnetworking_meets_music_listening.htm, Apr. 13, 2006.

"Touch Tunes Signs License Agreement for BMI Music in Digital Jukeboxes," www.bmi.com/news/200403/20040324b.asp, Web Page, BMI .TM. Figures Don'T Lie, Mar. 24, 2004.

A. Das, M. Datar, A. Garg, and S. Rajaram. 'Google News Personalization: Scalable Online Collaborative Filtering'. In WWW '07: Proceedings of the 16th international conference on World Wide Web, pp. 271-280, New York, NY, USA, 2007. ACM Press.

Adcock et al., "AreWeThereYet?—A Temporally Aware Media Player," In Proc. 9th Australasian User Interface Conference (AUIC 2008), Wollongong, Aust. 2008, pp. 29-32.

Alvear, Jose, "Risk-Free Trial Streaming Media Delivery Tools," Streaming Media.com; www.streamingmedia.com/article.ap?id=5768, Jun. 30, 2000.

Andreja Andric and Goffredo Haus, "Estimating Quality of Playlists by Sight," AXMEDIS'05, IEEE Computer Society Washington, DC, 2005.

Apple: iTunes 4.2 User Guide for Windows; Dec. 2003; retrieved from the internet: URL: http://www2.austin.cc.tx.us/tcm/projects/itunes.pdf; pp. 10, 17-19. (Added Ref Nov. 5, 2009).

Arto Lehtiniemi and Jamo Seppanen, "Evaluation of Automatic Mobile Playlist Generator," IS-CHI 2007: Mobile devices and services, 2007, pp. 452-459.

Asa Rudstrom, "Co-Construction of Hybrid Spaces," A Dissertation submitted to the University of Stockholm in partial fulfillment of the requirements for the Degree of Doctor of Philosophy, Department of Computer and Systems Sciences Stockholm University and Royal Institute of Technology, pp. 1-69, Nov. 2005.

Belkin, et al., 'Information Filtering and Information Retrieval: Two Sides of the Same Coin?', Communications of the ACM (Dec. 1992).

Bender, 'Twenty Years of Personalization: All about the Daily Me,' Educause Review (Sep./Oct. 2002).

(56) References Cited

OTHER PUBLICATIONS

Bender, et al., 'Newspace: Mass Media and Personal Computing,' Proceedings of USENIX, Conference, pp. 329-348 (Summer 1991).
Brenner, Ryan, "Not Your Average Jukebox," On Hollywood 1000 contender Ecast users broadbank to being the digital media experience to your watering hole, www.alwayson-network.com/comments.php?id=P12663 0 37 0 C, Web Page.
Cano, Pedro et al., "On the Use of FastMap for Audio Retrieval and Browsing," The International Conference on Music Information Retrieval and Related Activities (ISMIR 2002), Paris, France, Oct. 2002, 2 pages.
Carlson et al. "Internet Banking: Market Developments and Regulatory Issues," In the New Economy: What Changed, and the Challenges for Economic Policy, May 2001, http://www.occ.gov/netbank/SGEC2000.pdf.
Connell, Lain et al., "Ontological Sketch Models: Highlighting User-System Misfits," in P. Palanque, E. O'Neill and P. Johnson, editors, Proceedings of Human Computer Interaction (HCI) Bath, England, Sep. 2003, London Springer, pp. 1-16.
Crampes et al., "Automatic Playlist Composition in a Dynamic Music Landscape," SADPI'07, May 21-22, 2007, Montpellier, France, vol. 259, 2007, pp. 15-20.
Deshpande, Mukund, et al., 'Item-Based Top-N Recommendation Algorithms,' ACM Transactions on Information Systems, 22:1 (Jan. 2004), pp. 143-177.
Elias Pampalk, Arthur Flexer and Gerhard Widmer, "Improvements of Audio-Based Music Similarity and Genre Classification," in Proceedings of 6th International Conference on Music Information Retrieval (ISMIR'05), pp. 628-633, London, UK, Sep. 2005.
Hijikata et al., "Content-based Music Filtering System with Editable User Profile," Proc. of the 2006 ACM Symposium on Applied Computing, Dijon, France, pp. 1050-1057.
I. Scihira., "A Characterization of Singular Graphs," Electronic Journal of Linear Algebra, 16:451-462, 2007.
Industry Standard, The, Help FAQs for Standard Prediction Market, http://www.thestandard.com/help, downloaded Jun. 29, 2009.
IP City, Integrated Project on Interaction and Presence on Urban Environments—Demonstrators on Large-Scale Events Applications; ipcity.eu; Giulio Jacucci, John Evans, Tommi Ilmonen; pp. 1-37; Feb. 9, 2007.
J. Dean and S. Ghemawat, 'MapReduce: Simplied Data Processing on Large Clusters'. Commun. ACM, 51 (1):107-113, 2008.
J.M. Buldti, P. Cano, M. Koppenberger, J. A. Almendral and S> Boccaletti, "The complex network of musical tastes," New Journal of Physics, vol. 9, No. 6, Jun. 2007, p. 172, IOP Publishing Ltd., Bristol, United Kingdom and Deutsche Physikalische Gesellschaft.
Jimeng Sun, Dacheng Tao, Spiros Papadimitriou, Philip Yu, Christos Faloutsos, "Incremental tensor analysis: theory and applications," ACM, Oct. 2008, pp. 1-37.
Johan Bollen, Herbert Van de Sompel, Joan Smith, Rick Luce, "Toward alernative metrics of journal impact: a comparison of download and citation data," Google.com, 2005, pp. 1-2.
John Thompson, 'A Graphic Representation of Interaction With the NEXIS News Database,' MIT Thesis (May 1983).
Jon Orwant, 'Apprising the User of User Models: Doppelganger's Interface,' in: A. Kobsa and D. Litman (eds.), Proceeding of the 4th International Conference on User Modeling (1994).
Jonathan L. Orwant, 'Doppelganger Goes to School: Machine Learning for User Modeling,' MIT Master of Science Thesis (Sep. 1993).
Jonathan L. Orwant, 'Doppelganger: A User Modeling System,' MIT Bachelor's Thesis (Jun. 1991).
Leong et al., "Randomness as a Resource for Design," Proceedings of teh 6th conference on Designing Interactive systems, 2006, University Park, PA, pp. 132-139.
Lie, 'The Electronic Broadsheet—All the News That Fits the Display,' MIT Master's Thesis, pp. 1-96 (Jun. 1991).
Lippman, et al., 'News and Movies in the 50 Megabit Living Room,' IEEE/IEICE, Global Telecommunications Conference, pp. 1976-1981 (Nov. 15, 1987).
Loeb et al., "Lessons from LyricTimeTM: A Prototype Multimedia System" 4th IEEE ComSoc International Workshop on Multimedia Communications (Apr. 1992).
Loeb, Shoshana, "Architecting Personalized Delivery of Multimedia Information," Communications of the ACM (Dec. 1992).
Loeb, Shoshana, "Delivering Interactive Multimedia Documents over Networks," IEEE Communications Magazine, May 1992, 8 pages.
Logan, Beth et al., "A Music Similarity Function Based on Signal Analysis," IEEE International Conference on Multimedia and Expo (ICME), Tokyo, Japan, Aug. 2001, IEEE Press, pp. 952-955.
Logan, Beth, "Content-Based Playlist Generation: Exploratory Experiments," The International Conference on Music Information Retrieval and Related Activities (ISMIR 2002), Paris, France, Oct. 2002,2 pages.
M. O'Connor, D. Cosley, J.A. Konstan, J. Riedl, "PolyLens: A Recommender System for Groups of Users," European Conference on Computer Supported Co-Operative Work at Bonn, Germany, Published 2001, pp. 199-218.
Maidin, Donncha O et al., "The Best of Two Worlds: Retrieving and Browsing," Proceedings of the Cost G-6 Conference on Digital Audio Effects (DAFX-00), Verona, Italy, Dec. 7-9, 2000, 4 pages.
McCarthy, et al., "Augmenting the Social Space of an Academic Conference," Information School, University of Washington and Department of Computer Science and Engineering, University of Minnesota; pp. 1-10; Nov. 6-10, 2004.
N. A. Lazar, "Bayesian Empirical Likelihood," Technical Report, Carnegie Mellon University, Department of Statistics, 2000; 26 pages.
Notess, Mark et al., "Variations2: Toward Visual Interface for Digital Music Libraries," Second International Workshop on Visual Interfaces to Digital Libraries, 2002, 6 pages.
O'Connor, Mary Catherine, "RFID Brings Messages to Seattle Sidewalks: An RFID system being deployed next week will send marketing and assistive information to users carrying active RFID tags," www.rfidjournal.com/article/articleview/1619/1/1, Web Page, RFID Journal (pp. 1-4).
P. Indyk and J. Matousek. 'Low-Distortion Embeddings of Finite Metric Spaces'. In Handbook of Discrete and Computational Geometry, pp. 177-196. CRC Press, 2004.
Pachet, Francois, "A Taxonomy of Musical Genres," Content-Based Multimedia Information Access Conference (RIAO), Paris, Apr. 2000, 8 pages.
Paek, et al., "Toward University Mobile Interaction for Shared Displays," Microsoft Research, Redmond, WA, pp. 1-4, Nov. 6-10, 2004.

\* cited by examiner

GENERATING A CUSTOMIZED SOCIAL-DRIVEN PLAYLIST

PRIORITY

This application is entitled to the benefit of and incorporates by reference essential subject matter disclosed in U.S. application Ser. No. 16/454,668, filed on Jun. 27, 2019, which claims the benefit of U.S. Provisional 62/690,705, filed Jun. 27, 2018.

BACKGROUND

This disclosure relates generally to media item playlists and more specifically to generating personalized playlists from media items from a user's social media connections.

Music is an important part of interpersonal relationships, and one of the best ways to learn music is through one's interpersonal relationships. Because of this fact, some technologies display songs that have recently been played back by members of a user's social network. However, such technologies give too much importance to the influence of the social network and many of the songs that are displayed are irrelevant to the user.

SUMMARY

In one embodiment, a non-transitory computer readable medium comprising computer readable code executable by one or more processors is disclosed. The compute readable code is executable by the one or more processors to identify a user account for which a playlist is to be generated, wherein the user account is associated with a user listening history, a taste profile, and a social profile, identify one or more friend accounts linked to the user account based on the social profile, obtain an indication of a plurality of songs associated with one or more of the friend accounts, determine a listening history for the one or more plurality of songs based on the friend accounts, obtain a subset of the plurality of songs based on the listening history of the plurality of songs, and generate a playlist from the subset of the plurality of songs.

In another embodiment, system for generating a playlist is disclosed. The system may include one or more processors, and one or more computer readable media comprising computer readable code executable by the one or more processors. The computer readable code is executable by the one or more processors to identify a user account for which a playlist is to be generated, wherein the user account is associated with a user listening history, a taste profile, and a social profile stored on a social media server, obtain, from a social media server, an indication of one or more friend accounts linked to the user account based on the social profile, obtain an indication of a plurality of songs associated with one or more of the friend accounts, determine a listening history for the one or more plurality of songs based on the friend accounts, obtain a subset of the plurality of songs based on the listening history of the plurality of songs, and generate a playlist from the subset of the plurality of songs.

In another embodiment, method for generating a playlist is disclosed. The method includes identifying a user account for which a playlist is to be generated, wherein the user account is associated with a user listening history, a taste profile, and a social profile, identifying one or more friend accounts linked to the user account based on the social profile, obtaining an indication of a plurality of songs associated with one or more of the friend accounts, determining a listening history for the one or more plurality of songs based on the friend accounts, obtaining a subset of the plurality of songs based on the listening history of the plurality of songs, and generating a playlist from the subset of the plurality of songs.

DETAILED DESCRIPTION

Figure 1:
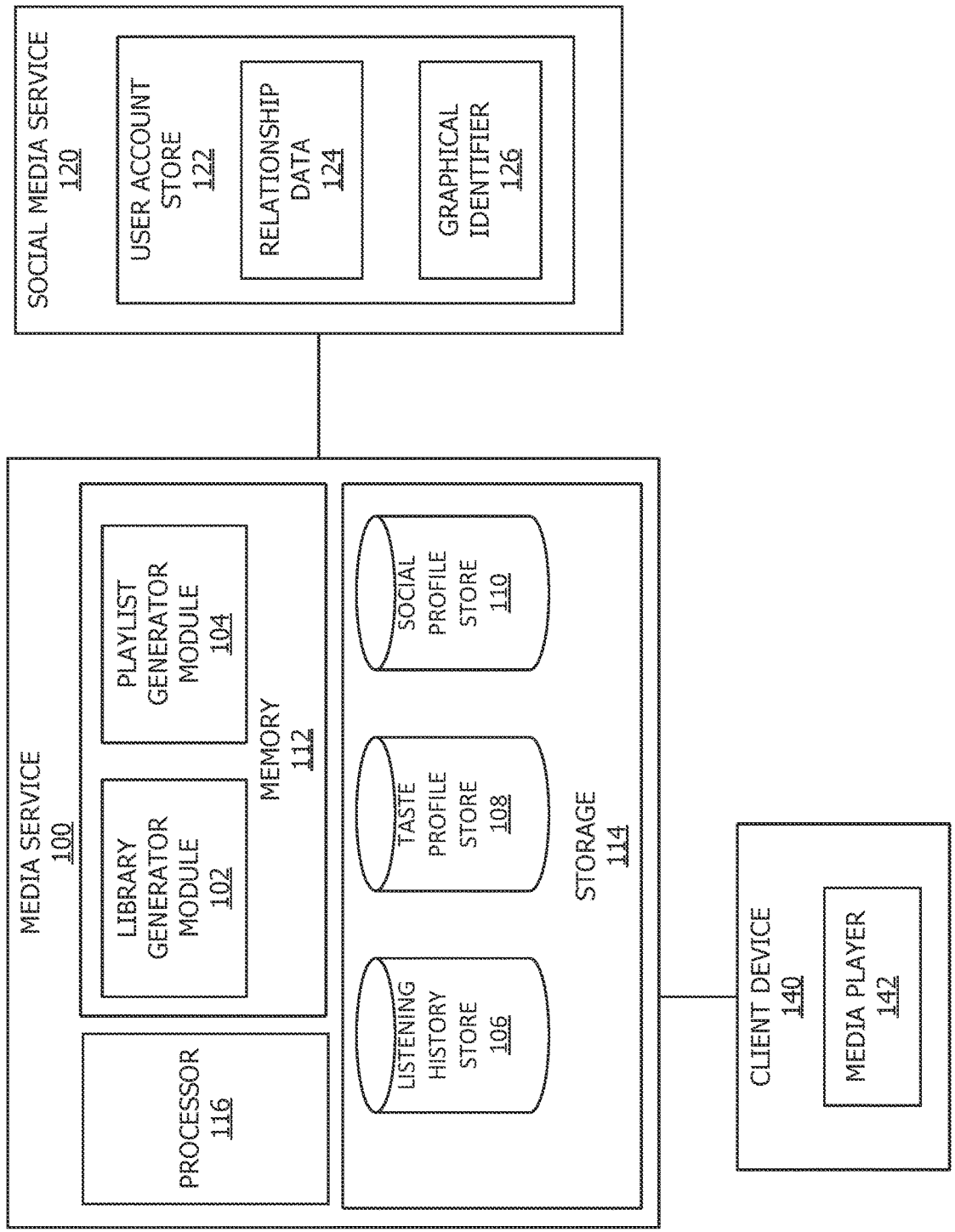
FIG. 1 shows, in block diagram form, a simplified network diagram according to one or more embodiments.

This disclosure is directed to systems, methods, and computer readable media for providing a socially-driven playlist. In general, techniques are disclosed to provide a playlist generated from songs obtained from friend accounts linked to a user account in a social network.

According to one or more embodiments, the disclosed technology addresses the need in the art to provide a customized playlist for a user that while influenced by a user account's social network, also take into account the user account's taste, by using songs or other media items from friend accounts with similar taste profiles. A user account for which a playlist is to be generated may be identified. The user account may be associated with personal data such as a user listening history, taste profile, and a social profile. One or more friend accounts may be identified as associated with the social profile, for example, in a social network. A plurality of songs are identified as being associated with the friend accounts. The plurality of songs may be refined by considering listening history of the friends. For example, only songs that have been listened to recently may be included. A playlist may then be generated from the refined plurality of songs.

According to one or more embodiments, the playlist may be displayed on a graphical user interface. The graphical user interface may include a graphical depiction for one or more songs or other media items of the playlist, such as album art or a depiction of the artist. In addition, according to one or more embodiments, the graphical depiction for the one or more songs may be modified or enhanced with a graphical indication of the user or users from which the song was obtained.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed embodiments. In this context, it should be understood that references to numbered drawing elements without associated identifiers (e.g., 100) refer to all instances of the drawing element with identifiers (e.g., 100a and 100b). Further, as part of this description, some of this disclosure's drawings may be provided in the form of a flow diagram. The boxes in any particular flow chart may be presented in a particular order. However, it should be understood that the particular flow of any flow diagram is used only to exemplify one embodiment. In other embodiments, any of the various components depicted in the flow chart may be deleted, or the components may be performed in a different order, or even concurrently. In addition, other embodiments may include additional steps not depicted as part of the flow chart. The language used in this disclosure has been principally selected for readability and instructional purposes, and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of image capture having the benefit of this disclosure.

For purposes of this disclosure, media items are referred to as "songs." However, in one or more embodiments, the media items referred to as "songs" could be any kind of media item, such as audio media items, video media items, visual media items, textual media items, podcasts, interviews, radio stations, and the like.

Referring to FIG. 1, a simplified block diagram is depicted of a media service 100 connected to a social media service 120 and a client device 140, for example over a network. Client device 140 may be a multifunctional device, such as a mobile phone, tablet computer, personal digital assistant, portable music/video player, wearable device, or any other electronic device that includes a media playback system.

Media service 100 may include one or more servers or other computing or storage devices on which the various modules and storage devices may be contained. Although media service 100 is depicted as comprising various components in an exemplary manner, in one or more embodiments, the various components and functionality may be distributed across multiple network devices, such as servers, network storage, and the like. Further, additional components may be used, some combination of the functionality of any of the components may be combined. Generally, media service 100 may include one or more memory devices 112, one or more storage devices 114, and one or more processors 116, such as a central processing unit (CPU) or a graphical processing unit (GPU). Further processor 116 may include multiple processors of the same or different type. Memory 112 may each include one or more different types of memory, which may be used for performing device functions in conjunction with processor 116. For example, memory 112 may include cache, ROM, and/or RAM. Memory 112 may store various programming modules during execution, including library generator module 102 and playlist generator module 104.

Media service 100 may store various personal data related to listening habits for users of the media service 100 within storage 114. Storage 114 may include one or more physical storage devices. The physical storage devices may be located within a single location, or may be distributed across multiple locations, such as multiple servers. The personal data may include a listening history for users may be stored in a listening history store 106. In one or more embodiments, user listening history may include information regarding songs or other media items that have been listened to or otherwise consumed, as well as timing information indicating a listening history for the songs or media items. The timing information may include, for example, a time stamp for a time at which the media item was last consumed, or may otherwise provide an indication for a specific or relative time at which the media item was last consumed. A taste profile for various users may be stored in taste profile store 108. The taste profile contains data regarding various users' taste in media items, and may be determined based on user input, user consumption habits, user feedback, and the like. Thus, according to one or more embodiments, the taste profile may be related in part to a playback of media items. The taste profile may indicate genres of interest to the user. The taste profile may be automatically determined based on the listening history of the user. The taste profile may also be determined, at least in part, by user input. For example, a user may select particular genres that may be of interest, or may be obtained from user feedback from user listening sessions. An example is a user may up vote or down vote songs that are played in the playlist, which the system may use to ascertain trends or other information for the taste profile. In one or more embodiments, the taste profile may be provided in a full version or a compact version, such as a hash, and may be provided in a manner such that taste profiles of two users may be compared to identify a similarity between the tastes of two users. As an example, if a taste profile is presented as a hash, then in one or more embodiments, a similarity between two taste profiles may be determined by determining how many bits need to be flipped to obtain one taste profile from the other. Thus, a similarity measure between two taste profiles may accordingly be represented by the distance between two taste profiles. Some embodiments for the comparison of taste profiles are described, for example, in U.S. patent application Ser. No. 15/872,929, which is herein incorporated by reference. Additionally, or alternatively, the affinity score may be based on a comparison of the listening history of the user account and the friend account from listening history store 106. For example, the listening history of the accounts may indicate similar genres, songs, music styles, media types, and the like, and the affinity score between the two accounts may indicate how similar the listening history of the two accounts are.

The personal data may also include a social profile for the users of the media service 100, which may be stored in the social profile store 110. In one or more embodiments, the social profile store may include affinity scores between various users of the media service 100. The affinity score may indicate a closeness between two user accounts. In one or more embodiments, the affinity scores may be determined, at least in part, based on a similarity measure between the taste profiles of two users. Said another way, affinity between two users may be based in part on a similarity of the tastes of the two users, which may be calculated as described above. The social profile store 110 may also manage changes or customizations between users of the media service 100. For example, a user may select to upgrade, downgrade, connect with a friend, or disconnect with a friend. In one or more embodiments, the social profile store 110 may manage social relationships specific to use of the media service 100. For example, a user may have very disparate taste in music than a social connection and may prefer to disconnect from that social connection such that the music associated with that social connection is no longer used to generate playlists.

Some of the data utilized for the social profile store may be obtained from a social media service 120. The social profile may include a user account store 122 in which relationship data 124 is manage which indicates a set of user accounts linked to a particular user account, along with graphical identifiers 126 representative of each of the user accounts. For example, the friend accounts may belong to other users that the instant user has selected to be connected to in a social network. Each friend account may include their own user information, such as listening history, taste profile, and social media profile, which may also be stored in media service 100. In one or more embodiments, the relationship data 124 may be used to supplement data in the social profile store 110. In one or more embodiments, predetermined relationships between users indicated within relationship data 124 may supplement relationship data in social profile store 110. As an example, a particular user's connections within social media service 120 may be used to identify and propagate social connections in social profile store 110. Relationship data 124 may also be used to determine the affinity score between users stored in social profile store 110. In one or more embodiments, the affinity score may be determined based on the user account social profile and the friend account social profile, such as how often the two accounts interact, a relationship level indicated by the social profiles, or the like.

Returning to the media service 100, the memory 112 includes modules that include computer readable code executable by processor 116 to cause the media service 100 to perform various tasks. As depicted, the memory 112 may include a library generator module 102 and a playlist generator module 104. According to one or more embodiments, the library generator module 102 generates a library from which playlists may be generated for a particular user. The library may be user-specific, such as specific to a user of client device 140. The library may be comprised of songs or other media items associated with friend accounts socially connected to the particular user account. In one or more embodiments, the songs or other media items in the library may include only a portion of all songs or media items associated with social connections to the particular user. For example, the number of songs may be limited to a particular number, and may be selected for inclusion based on a threshold relevance score. Further, the songs may be included in the library based on listening history such that most recently played songs among the friend accounts are included. According to one or more embodiments the various songs associated with friend accounts may be assigned relevance scores based on any number of factors, such as how frequently the song is played, how recently the song was played, the number of friend accounts associated with the song, an affinity score for a friend account or friend accounts associated with the song, and the like. According to one or more embodiments, selectively choosing which songs should be included in a library may optimize storage and/or processing resources required to generate customized playlists without reducing quality.

Memory 112 also includes a playlist generator module 104. In one or more embodiments, the playlist generator module 104 may prepare customized playlists for a particular user from a library of songs generated by library generator module 102. The playlist generator module 104 may generate a playlist on request from a user, such as a user of media player 142 of client device 140. Additionally, or alternatively, the playlist generator module 104 may periodically prepare new playlists, such as on a daily, weekly, or monthly basis. Further, playlist generator module 104 may generate playlists in response to a trigger. Examples of a trigger include a change in a social profile of a particular user, such as the addition or deletion of a social connection, or a change in the user's taste profile. According to one or more embodiments, playlists may be generated based on a requested or determined genre. For example, the genre may be requested by a user, or may be determined based on common genres that occur within the library, or based on the user taste profile and/or the user listening history. In one or more embodiments, a playlist may be based on other seeds, such as a particular artist, tempo, style of music, decade, and the like.

Upon generation of the playlist, the playlist generator module 104 may generate a graphical user interface within which to present the playlist. According to one or more embodiments, the playlist generator module 104 may generate a graphical display of the playlist such that the graphical display provides an indication of the songs of the playlist along with an indication of the friend accounts from which the songs were obtained. The graphical user interface may include a graphical depiction for one or more songs or other media items of the playlist, such as album art or a depiction of the artist. the graphical depiction for the one or more songs may be modified or enhanced with a graphical indication of the user or users from which the song was obtained. In an alternate embodiment, the graphical indication could be a graphical ribbon of users displayed above, below, or otherwise in the vicinity of the playlist in the graphical user interface. The graphical indication may be, for example, an image of the user or users. In one or more embodiments, if the song was obtained from multiple users, then a single user or multiple users may be represented by the graphical indication. In one or more embodiments, the graphical identifier of the user may be obtained from social media service 120, such as in the graphical identifier 126 of the user account store 122. That is, in one or more embodiments, the graphical identifier may be an image that represents the friend account in a social network.

Figure 2:
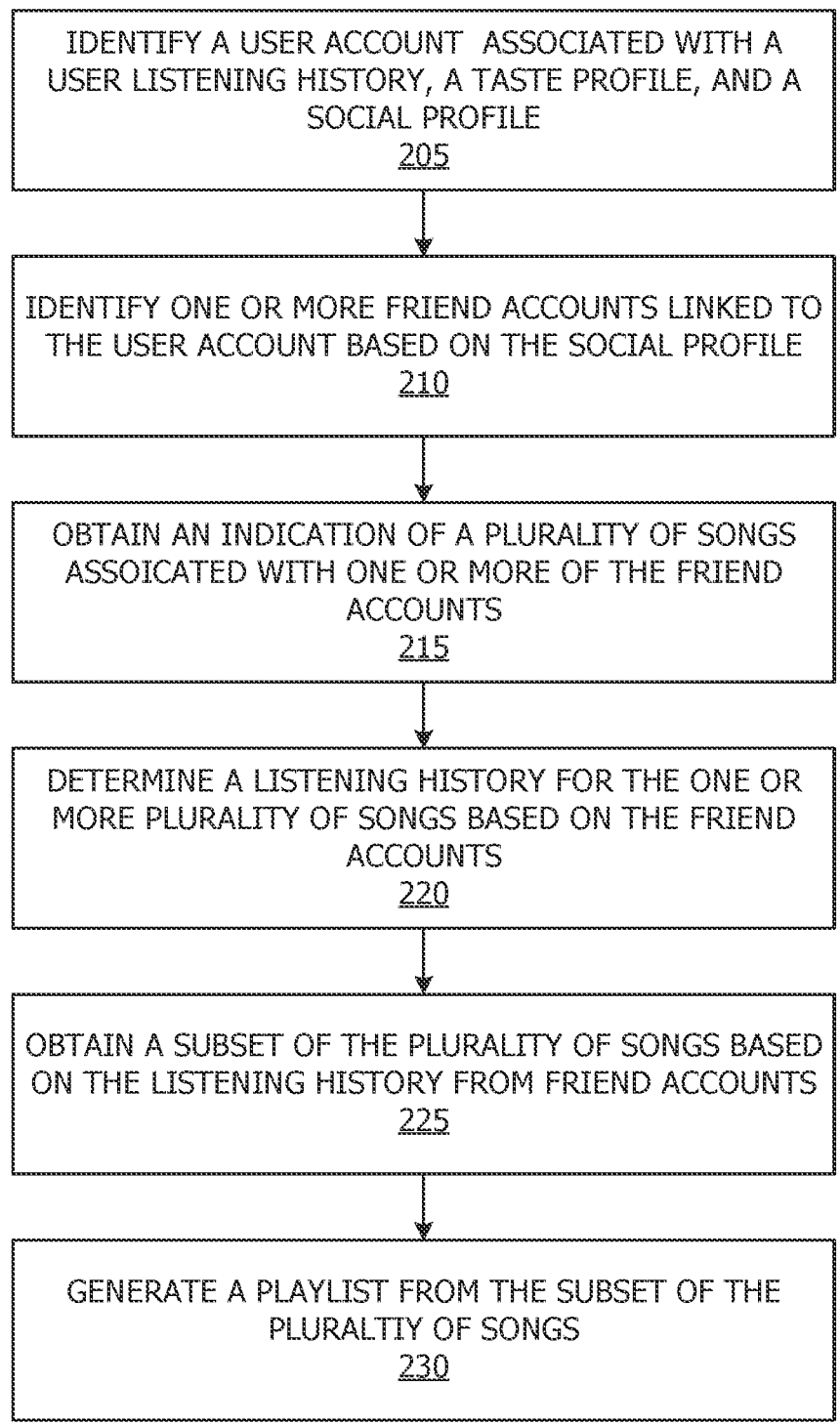
FIG. 2 shows, in flow chart form, an example method for generating a playlist based on social data, according to one or more embodiments.

FIG. 2 shows, in flow chart form, an example method for generating a playlist based on social data, according to one or more embodiments. For purposes of explanation, the following steps will be described in the context of FIG. 1. However, it should be understood that the various actions may be taken by alternate components. In addition, the various actions may be performed in a different order.

Further, some actions may be performed simultaneously, and some may not be required, or others may be added.

The flow chart begins at 205 where the library generator module 102 identifies a user account associated with a user listening history, a taste profile, and a social profile. According to one or more embodiments, the user account may be a user of the media service, as shown in FIG. 1. The user account identified is a user account for which a customized playlist is to be generated. The user account may be identified, for example, in response to a request for a customized socially-driven playlist. According to one or more embodiments, the user account may be identified in response to determining that the user account is eligible for creation of a customized playlist. For example, the library generation module 102 may require that a user account have a threshold number of associated friend accounts in order to build a library and thus generate a playlist from the library. As another example, the library generation module 102 may require a threshold level of personal information stored by the music service, such as sufficient data to build a listening history and/or a taste profile for the user account.

The flow chart continues at 210, where the library generator module 102 identifies one or more friend accounts linked to the user account based on the social profile. According to one or more embodiments, the user account may be linked to friend accounts within the music service, such as a music service-specific social media network. In one or more embodiments, the user account may additionally, or alternatively, be connected to friend accounts based on a social media network separate from the media service. In one or more embodiments, the friend accounts may be identified based on social profile store 110 and/or relationship data 124. As will be described in greater detail below with respect to FIG. 3, identifying the friend accounts may include identifying a subset of friend accounts socially connected to the user account, for example, based on affinity scores for the friend accounts.

In one or more embodiments, other factors may be considered when identifying the friend accounts. According to one or more embodiments, contextual information may be considered. For example, the library generator module 102 may obtain geographic location information for a user account and a friend account. If a device associated with a user account and a device associated with a friend account are within a same geographic area, such as at a same social event, those friends may be selected to be used to generate the library. In one or more embodiments, the friend accounts used to generate the library may be selected automatically, or may be requested by a use, such as a user of client device 140.

At 215, the library generator module 102 obtains an indication of a plurality of songs associated with one or more of the friend accounts. Said another way, the library generator module 102 determines a set of songs that friends of a user have been listening to. In one or more embodiments, each friend account may be associated with a plurality of songs in a number of ways. For example, a user associated with a friend account may have music or other media files stored on one or more client devices owned by the user. As another example, a user of a friend account may utilize the media service 100 for streaming songs, and may tag certain songs as being favorites, adding them to a playlist, or otherwise marking songs as being of particular interest to the user. In one example, the library generator module 102 may obtain a list of songs played by a friend account recently, such as within a predetermined time. The flow chart continues at 220, where the library generator module 102 determines a listening history for the one or more plurality of songs based on the friend accounts. The listening history may be obtained from listening history store 106. The listening history store 106 may be used to identify a length of time that has elapsed since the last time a friend account played a particular song, or may classify songs associated with a friend account based on a length of time since the song was last played (e.g., within the last day, within the last week, within the last month, etc.).

At 225, the library generator module 102 obtains a subset of the plurality of songs based on the listening history from friend accounts. Said another way, the library generator module 102 may build a library from the obtained subset of the plurality of songs. In one or more embodiments, the subset is obtained to produce a smaller, customized set of songs than the plurality of songs obtained at 215. As will be described in greater detail below with respect to FIG. 4, the listening history may be used to determine a relevance score for each song. The subset of the plurality of songs may also be obtained based on a weighted strength of the friend account from which the song was obtained.

The flow chart concludes at 230 where the playlist generator module 104 generates a playlist from the subset of the plurality of songs. The playlist may be generated on demand, in response to a request from the user. Alternatively, or additionally, the playlist generator module 104 may periodically generate one or more playlists and offer the playlists to the user, such as through media player 142 of the client device 140. Further, in one or more embodiments, playlists may be generated based on a context of the user. In one or more embodiments, contexts may be determined from sensor data from the client device 140, or from other data associated with the user account, such as calendar entries, websites visited, email, and the like. According to one or more embodiments, context-specific customized playlists may be generated by identifying songs with tags that are associated with a particular context. geotags may be used to determine where a user is located, and songs associated with that geotag may be weighted as more relevant while the user is in the determined location. As another example, other contextual information may be used to differently weight the songs. For example, if a user is in a location such as a gym, songs with an upbeat tempo may be weighted more heavily. By contrast, if a user is determined to be in a library, a slower tempo may be more heavily weighted. In one or more embodiments, the characteristics of the songs may be determined based on tags or other metadata stored with respect to the song. As an example, tags may identify a particular song as acoustic, aggressive, rhythmically complex, danceable, energetic, fast, happy sounding, harmonious, melodic, percussive, relaxing, smooth, and the like. In one or more embodiments, the type of song weighted heavily for a particular context may additionally be based on the user's taste profile, which may indicate a user's taste in a particular context. As an example, one user may prefer acoustic songs while driving, whereas another user may prefer aggressive songs. Some embodiments for determining relevant contexts for media items are described in U.S. patent application Ser. No. 15/720,880, which is herein incorporated by reference.

Customized playlists may be generated in a number of ways. A description of some of the ways a customized playlist may be generated may be found in U.S. patent application Ser. No. 15/273,428, entitled "Personal Music Content," which is herein incorporated by reference. As will be described in greater detail below with respect to FIG. 7, the playlist generator module 104 may cause transmission of the playlist to the client device 140 along with or as part of a graphical user interface (GUI).

Figure 3:
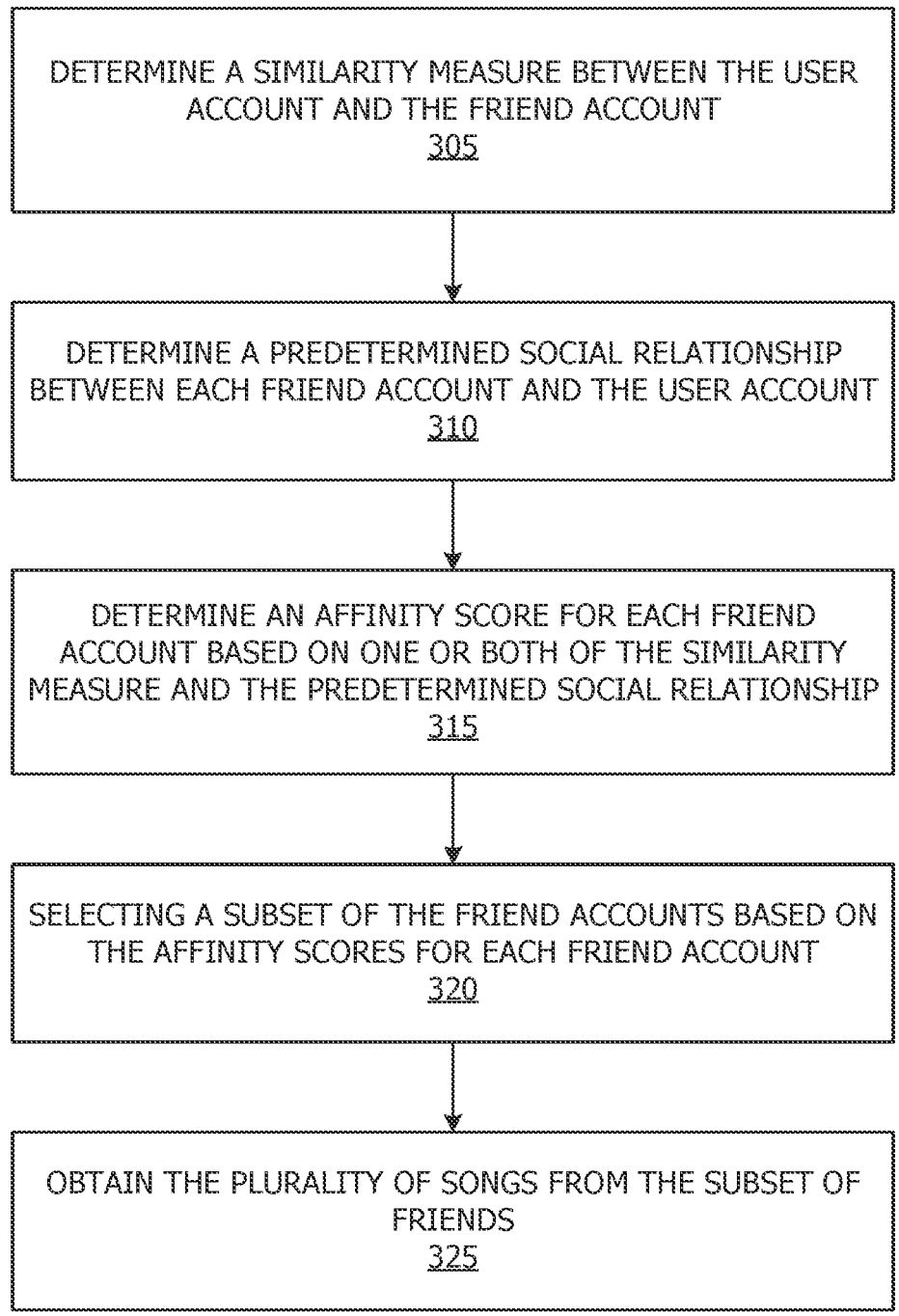
FIG. 3 shows, flow chart form, an example method for building a library from which a playlist may be generated in accordance with one or more embodiments.

FIG. 3 shows, flow chart form, an example method for building a library from which a playlist may be generated in accordance with one or more embodiments. Specifically, FIG. 3 shows a flow chart that depicts how the plurality of songs are obtained, for example at 215 of FIG. 2.

The flow chart begins at 305 where the library generator module 102 determines a similarity measure between each friend account and the user account. In one or more embodiments, the similarity measure may be based on a comparison of a taste profile for the user account and a taste profile for the friend account. As described above, in one or more embodiments, the taste profile may be expressed in the form of a hash, where a similarity between the user account and the friend account may be determined based on how many bits must be flipped from the taste profile of the user account to achieve the taste profile of the friend account. Additionally, or alternatively, the similarity measure may be based on a comparison of the listening history of the user account and the friend account. For example, if the user account has listened to very similar music within the last week, but the use account and the friend account otherwise have disparate taste profiles, the similarity measure between the user account and the friend account may be stronger than it would be otherwise not taking into consideration the listening history of the two accounts.

The flow chart continues at 310, where the library generator module 102 determines a predetermined social relationship between each friend account and the user account. According to one or more embodiments, the predetermined social relationship may be one selected or identified by the user and/or a user associated with the friend account. For example, the social profile store 110 and/or the relationship store 124. In one or more embodiments, a certain closeness of a relationship may indicate that songs associate with certain friend accounts may be weighted more heavily. For example, two users who interact frequently in a social network application, or two users who have self-identified as being in a relationship, or being related, may be weighted more heavily. At 315, the library generator module 102 determines an affinity score for each friend account based on one or both of the similarity measure and the predetermined social relationship.

The flow chart continues at 320, and the library generator module 102 selects a subset of the friend accounts based on the affinity scores for each friend account. In one or more embodiments, a number of friends included in the subset may be based on a threshold affinity score. For example, a predetermined threshold for the affinity score may be used to select the subset of friends. Alternatively, or additionally, the number of friends included in the subset may be based on a number of songs associated with the plurality of friends. For example, the friend accounts may be ranked based on affinity score, and a number of friend accounts may be selected from the top ranked friend accounts such that the number of songs associated with the selected friend accounts constitute a threshold number of songs. The flow chart concludes at 325 when the library generator module 102 obtains the plurality of songs from the subset of friends.

Figure 4:
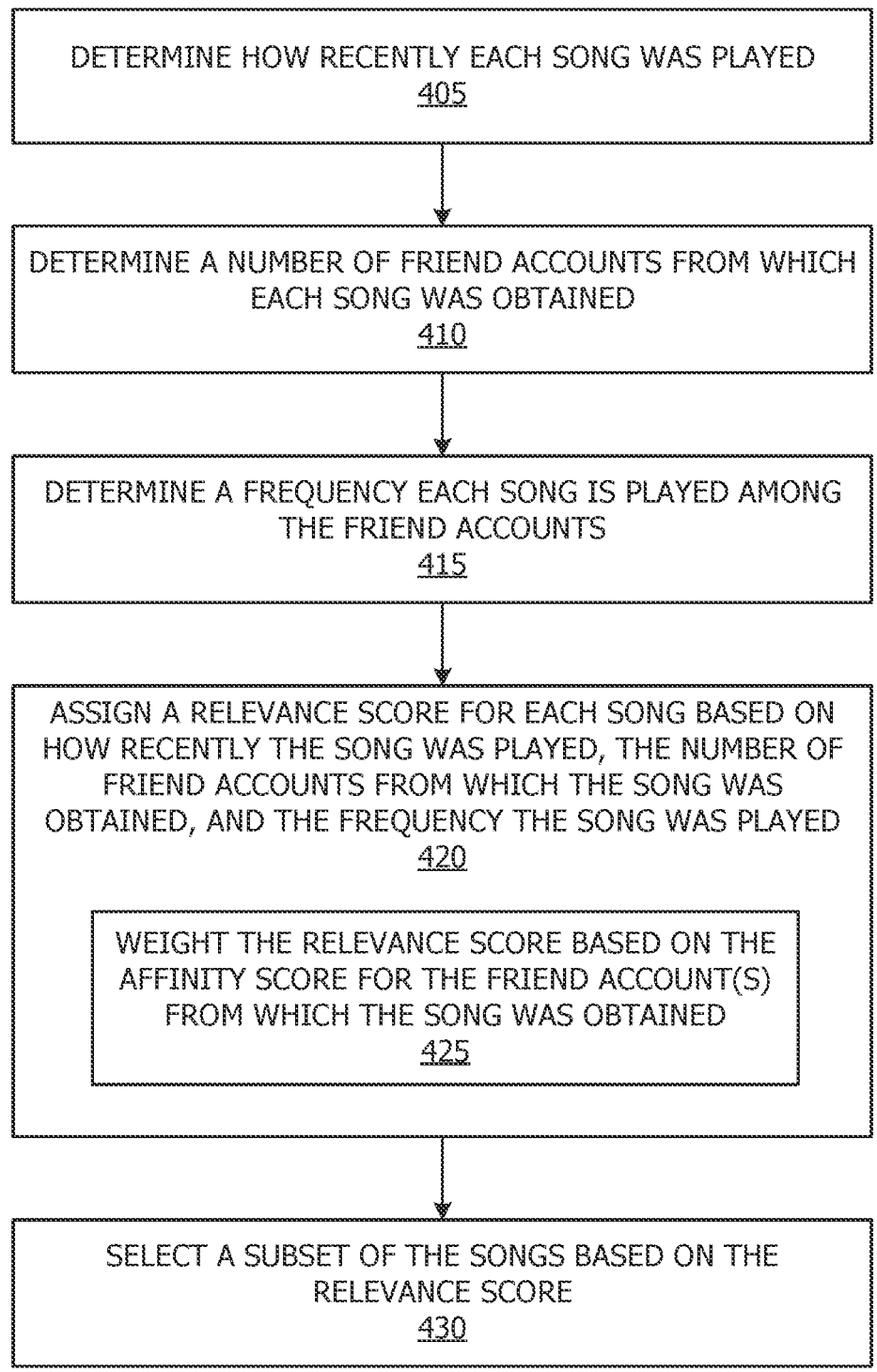
FIG. 4 shows, in flow chart form, an example method for selecting a subset of songs based on an assigned relevance score for each song, according to one or more embodiments.

FIG. 4 shows, in flow chart form, an example method for selecting a subset of songs based on an assigned relevance score for each song, according to one or more embodiments. In one or more embodiments, FIG. 4 describes a more detailed view of selecting a subset of songs as in 225 of FIG. 2 for example.

The flow chart begins at 405, where a library generator module 102 determines how recently each song was played. According to one or more embodiments, songs may be considered more relevant the more recent they were played. How recently each song was played may be determined, for example, from the listening history store 106. In one or more embodiments, the library generator module 102 may obtain an indication of how recently a song was played based on a listening history for the friend account from which the song was obtained. The listening history store may include a time stamp indicating the last time a song was played by the friend account, or may include a categorization of how recently the song was played by the friend account from which the song was obtained. The flow chart continues at 410, and the library generator module 102 determines a number of friend accounts from which each song was obtained. In one or more embodiments, the library generator module 102 may determine the number of friends based on a listening history for each friend account from the listening history store 106. According to one or more embodiments, the number of friend accounts may be determined out of the identified friend accounts from 210 of FIG. 2. At 415, the library generator module 102 determines a frequency each song is played among the friend accounts. The frequency may also be determined from the listening history store 106. According to one or more embodiments, frequency may be determined within a predetermined period of time, such as within the last day, week, or month. Frequency may be determined with respect to all friends (i.e., how frequently the song is played among all selected friend accounts, or among the combined friend accounts from which the song is obtained). Alternatively, frequency may be determined on an individual basis based on the one or more friend accounts from which the song is obtained.

The flowchart continues at 420, when the library generator module 102 assigns a relevance score for each song based on one or more of how recently the song was played, the number of friend accounts from which the song was obtained, and the frequency the song was played. The various metrics may be weighted in different manners, according to one or more embodiments. For example, how recently a song was played may have less importance than how frequently a song is played. In one or more embodiments, assigning the relevance score also includes, at 425, weighting the relevance score based on the affinity score for the friend account(s) from which the song was obtained. For example, the affinity score between accounts of romantic partners or family members may be weighted more heavily based on the predetermined relationship.

The flow chart concludes at 430, when the library generator module 102 selects a subset of the songs based on the relevance score. According to one or more embodiments, the subset of songs may be all the songs or may be a portion of the songs for which a relevance score is determined. Further, in one or more embodiments, the subset may be determined based on a threshold number of songs to be included in the subset as well as the relevance score. That is, the songs for which a relevance score is assigned may be ranked, and a number of songs may be selected based on the threshold. The threshold may also be provided in other ways, such as a threshold data size such that the number of songs satisfies a certain data size.

Figure 5:
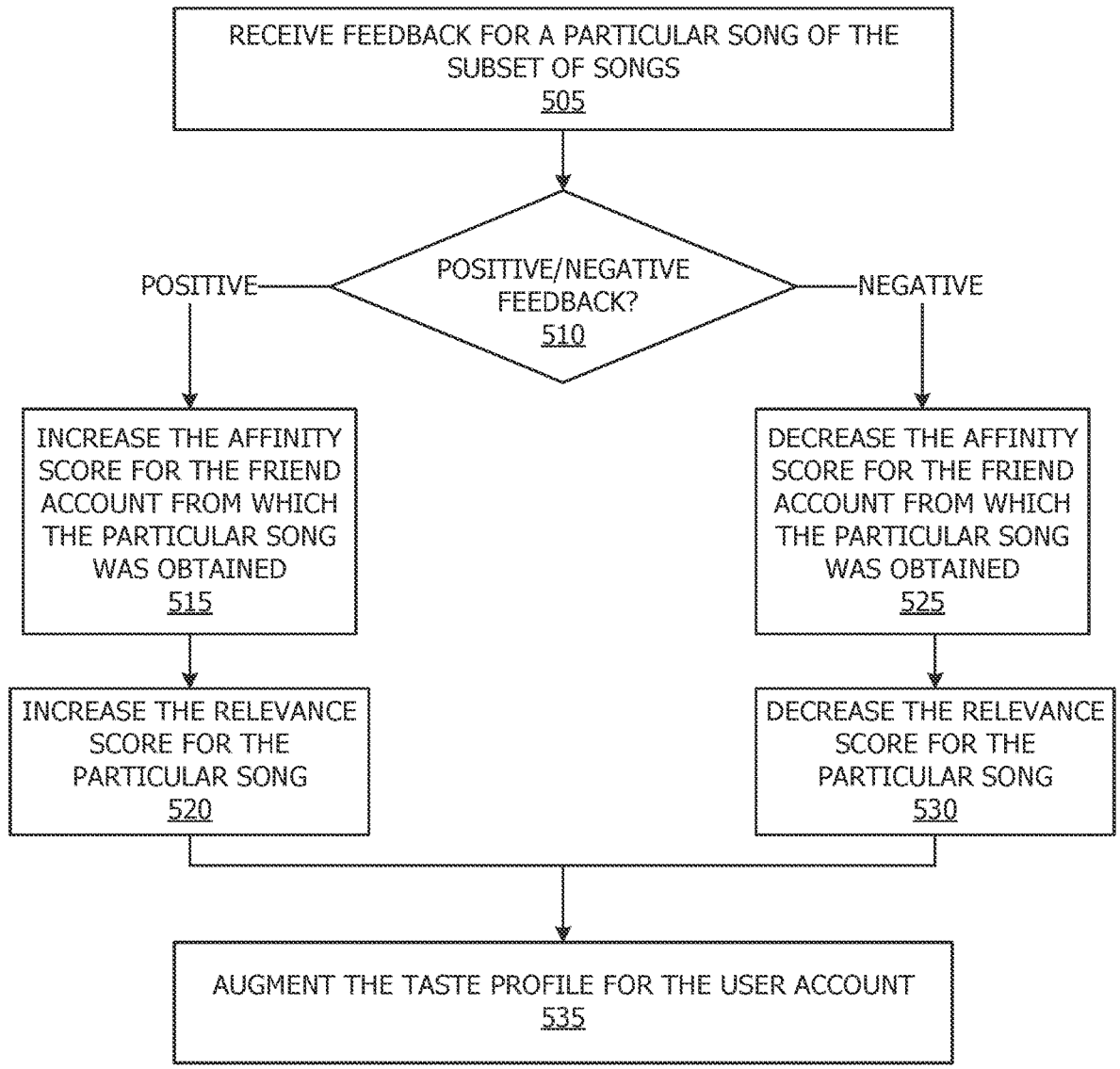
FIG. 5 shows an example flow chart for managing feedback for a particular song in a playlist, according to one or more embodiments.

FIG. 5 shows an example flow chart for managing feedback for a particular song in a playlist, according to one or more embodiments. Specifically, FIG. 5 describes how relevance scores and affinity scores are impacted by feedback for a particular song from a user, once the generated playlist is presented to the user.

The flow chart begins at 505 where the library generator module 102 receives feedback for a particular song of the subset of songs. The feedback may be received through a graphical user interface, for example. According to one or more embodiments, a user may provide feedback for a particular song by providing an indication that the user enjoys the song, or that the user does not enjoy the song. In one or more embodiments, the user feedback may be more passive. For example, a user listening to the entire length of a song may be considered positive feedback, whereas a user skipping a song may be considered negative feedback.

The flow chart continues at 510, and a determination is made regarding whether the feedback is positive or negative. If the feedback is positive, then the flow chart continues at 515 and the library generator module 102 increases the affinity score for the friend account from which the particular song was obtained. The flow chart continues at 520 and the library generator module 102 increases the relevance score for the particular song. According to one or more embodiments, the feedback may indicate a relative level of positive feedback (e.g., like or love a song, rate out of five stars, and the like). In the case where the feedback includes a relative level of positive feedback, the affinity score and/or the relevance score may be increased accordingly.

Returning to 510, if the feedback is negative, then the flow chart continues at 525 and the library generator module 102 decreases the affinity score for the friend account from which the particular song was obtained. The flow chart continues at 530 and the library generator module 102 decreases the relevance score for the particular song. Similar as described above to positive feedback, in the case where the feedback includes a relative level of positive feedback, the affinity score and/or the relevance score may be increased accordingly. The flowchart concludes at 535 when the library generator module 102 augments the taste profile for the user account.

Figure 6:
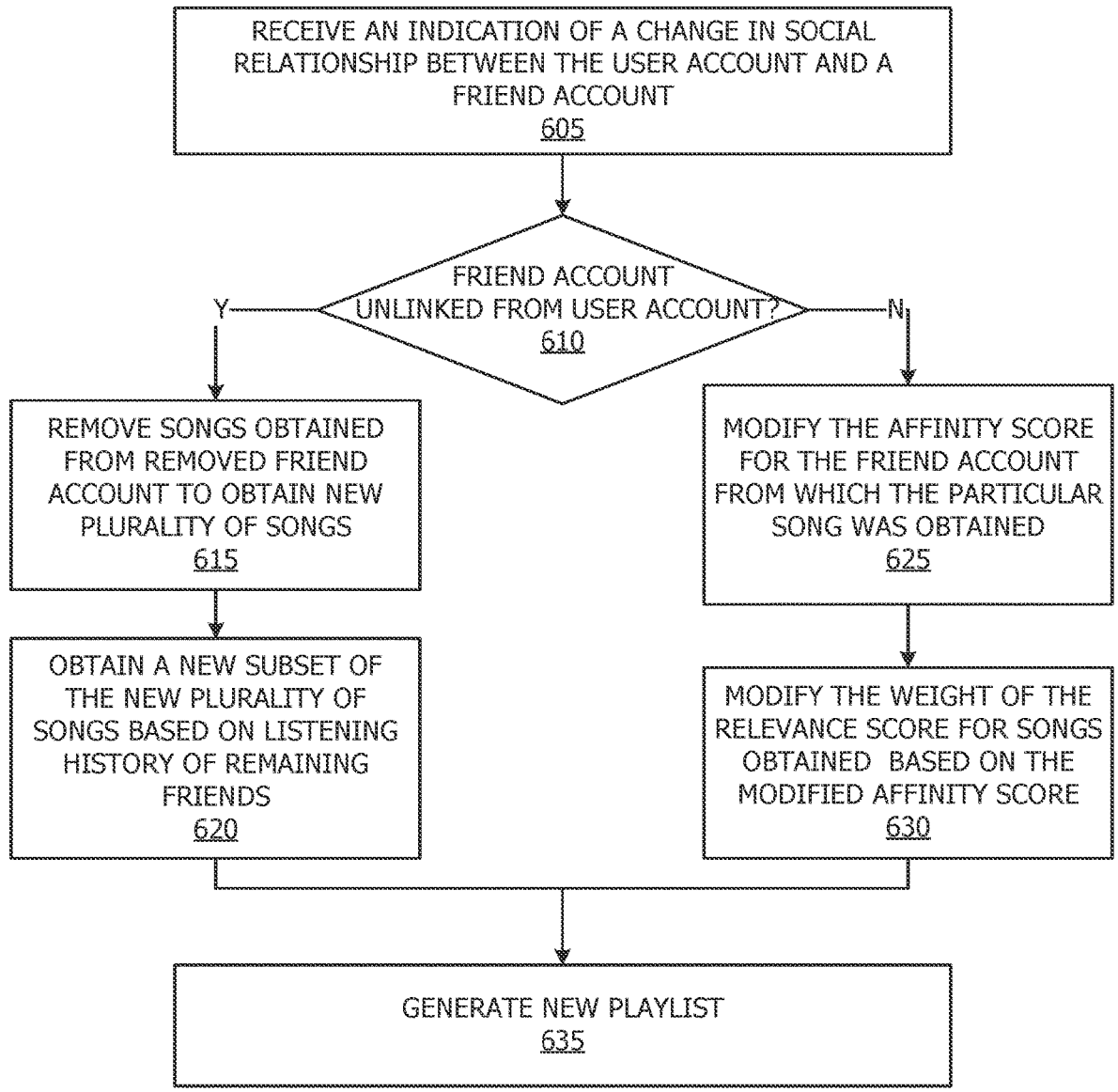
FIG. 6 shows, in flow chart form, an example method for managing a change in relationship between a user and a friend, according to one or more embodiments.

FIG. 6 shows, in flow chart form, an example method for managing a change in relationship between a user and a friend, according to one or more embodiments. As described above, relationships between the user account and friend accounts may be managed by either the media service 100 or the social media service 120, which may be separate from the media service 100 (i.e., a separate social network). According to one or more embodiments, a change in a relationship between two users may trigger a change in how media items from those users are treated for each other. Thus, a change in a relationship between two user accounts may trigger an update to the library and, thus, an update to the playlist.

The flow chart begins at 605, when the library generator module 102 receives an indication of a change in social relationship between the user account and a friend account. As an example, one or both of the user account and the friend account may indicate a change in relationship. For example, the two accounts may be newly linked. As another example, one account may select to disengage with the other or otherwise remove the friend account from a list of friend accounts. As yet another example, a type of relationship may be changed, such as a change in a romantic relationship between users of two accounts.

The flowchart continues at 610 and a determination is made regarding whether the friend account is unlinked from the user account. If at 610 it is determined that the friend account is unlinked from the user account, then the flow chart continues at 615, and the library generator module 102 removes songs obtained from the removed friend account to obtain a new plurality of songs. The flow chart continues at 620 where the library generator module 102 obtains a new subset of the new plurality of songs based on the listening history of the remaining friends.

Returning to 610, if a determination is made that the friend account is not unlinked from the user, the flow chart continues at 625, where the library generator module 102 modifies the affinity score for the friend account from which the particular song was obtained. The flow chart continues at 630 when the library generator module 102 modifies the weight of the relevance score for songs obtained based on the modified affinity score.

The flowchart concludes at 635 when the library generator module 102 generates a new playlist. According to one or more embodiments, a change in relationship may trigger a new playlist to be generated. Further, according to one or more embodiments, the new playlist may be generated the next time a playlist is periodically generated.

Figure 7:
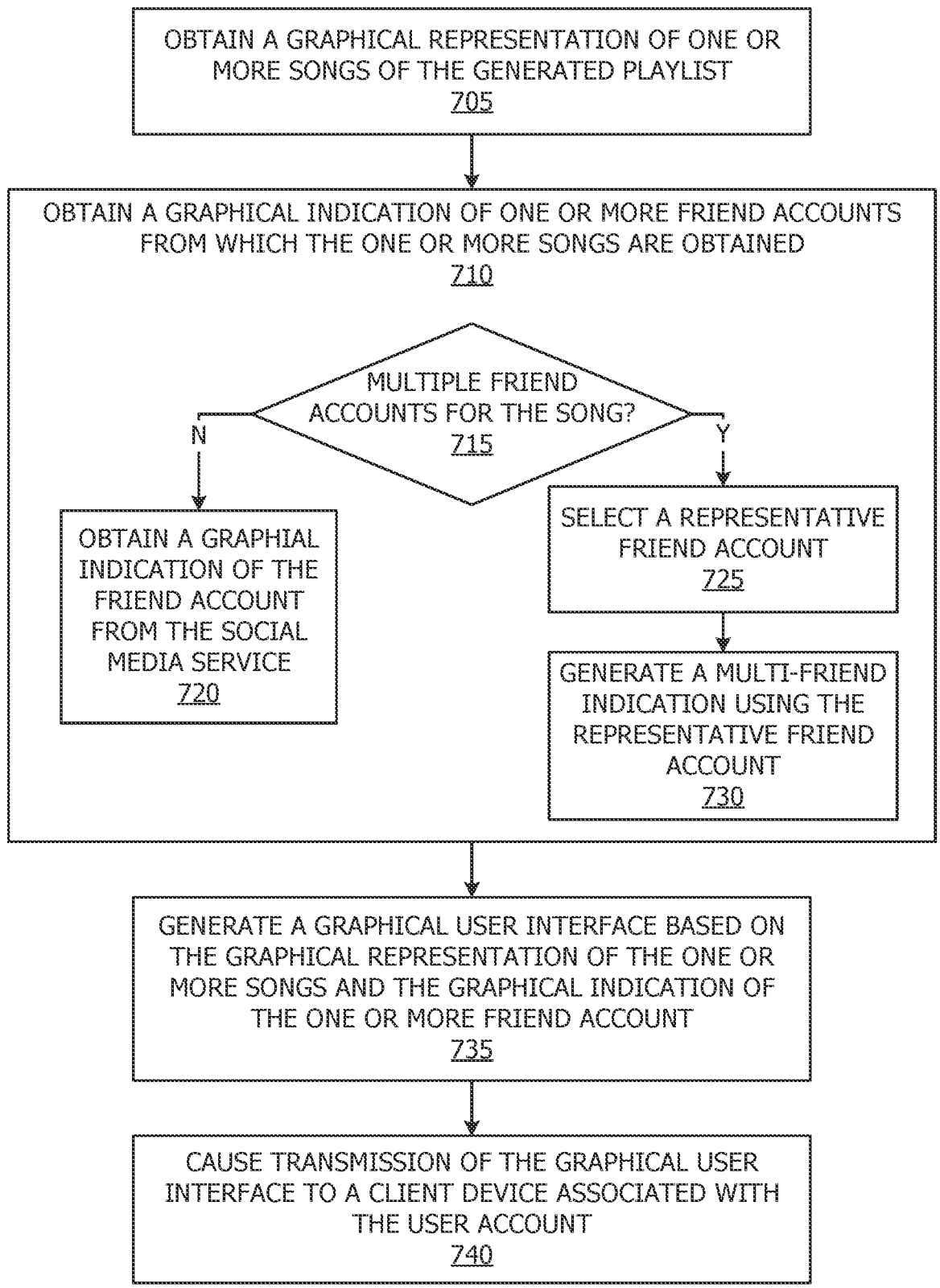
FIG. 7 shows, in flow chart form, an example method for generating a graphical user interface for the socially-driven playlist, according to one or more embodiments.

FIG. 7 shows, in flow chart form, an example method for generating a graphical user interface (GUI) for the socially-driven playlist, according to one or more embodiments. In one or more embodiments, the GUI may improve the display of data related to a playlist by better identifying why a particular song was added to the playlist. For example, in this disclosure, the GUI may present a song or other media item along with an indication of a friend account from which the song was obtained.

The flow chart begins at 705 when the playlist generator module 104 obtains a graphical representation of one or more songs from the generated playlist. The graphical representation may be obtained for each song of the playlist generated by playlist generator module 104. According to one or more embodiments, the graphical representation of the one or more songs may include album artwork, an image of the artist, or the like. The graphical representation may be obtained from the media service 100, or from a different location across a network. Further, a default graphical image may be utilized in the case where the graphical representation of the one or more songs are unavailable.

The flow chart continues at 710 and the playlist generator module 104 obtains a graphical indication of one or more friend accounts from which the one or more songs are obtained. A graphical representation may be obtained for each friend account from which a song was obtained for the playlist. As described above, the graphical indication of the friend account may be obtained from within the media service 100. For example, a user may select a graphical image that represents their user account. In one or more embodiments, the graphical indication may be obtained from a separate social media service 120, such as from the graphical identifier 126 of the user account store 122. Thus, the graphical representation of the user may be specific to the media service, or may be related to a separate social media service.

Optionally, the flow chart includes, at 715, a determination as to whether multiple friend accounts are associated with the song. If a determination is made at 715 that multiple friend accounts are not associated with the song, then the flow chart continues at 720 and the playlist generator module 104 obtains a graphical indication of the single friend account, for example, from the social media service. Returning to 715, if a determination is made that multiple friend accounts are associated with the song, then the flow chart continues at 725, and the playlist generator module 104 optionally selects a representative friend account. The flow chart then continues at 730 and the playlist generator module 104 generates a multi-friend indication using the representative friend account. Alternatively, if the determination is made that multiple friend accounts are associated with the song, then graphical representations for each of the friend accounts may be obtained and a multi-friend representation may be generated, for example by presenting all the graphical representations for all the friend accounts, or by showing a stacked version of the graphical representation of the friend accounts, where a first graphical representation of a first representative friend account is fully visible, and additional graphical representations of one or more additional friend accounts are partially visible. The representative friend account may be selected in a number of ways. For example, the representative friend may be selected based on a predetermined social relationship between the user account and the friend account. That is, a closeness in a social network. As another example, the representative friend may be selected based on an affinity score between the friend account and the user account (i.e., the friend account with the highest affinity score for the user account is selected). In another embodiment, the representative friend may be selected based on the listening history of the friend accounts. For example, a representative friend may be chosen based on a friend account whose listening history indicates the friend was the last user to listen to the song, the friend account which has listened to the song with the greatest frequency, and the like.

The flow chart continues at 735 where the playlist generator module 104 generates a graphical user interface based on the graphical representation of the one or more songs and the graphical indication of the one or more friend accounts. According to one or more embodiments, the graphical indication of the one or more friend accounts may be presented in association with the graphical representation of the one or more songs associated with the friend account. That is, a graphical representation of a song may be presented as associated with the graphical indication of the friend account from which it was obtained. In one or more embodiments, the graphical indication of the friend account may be presented in a badging manner, such that the graphical indication of the friend account may be overlaid on the graphical representation of the corresponding song. According to one or more embodiments, the graphical user interface may additionally, or alternatively, present the graphical representations of the friend accounts that contributed to the playlist separately from the graphical representations of the one or more songs, for example in a ribbon format. The flow chart concludes at 740 when the playlist generator module 104 causes transmission of the graphical user interface to a client device associated with the user account.

Figure 8A:
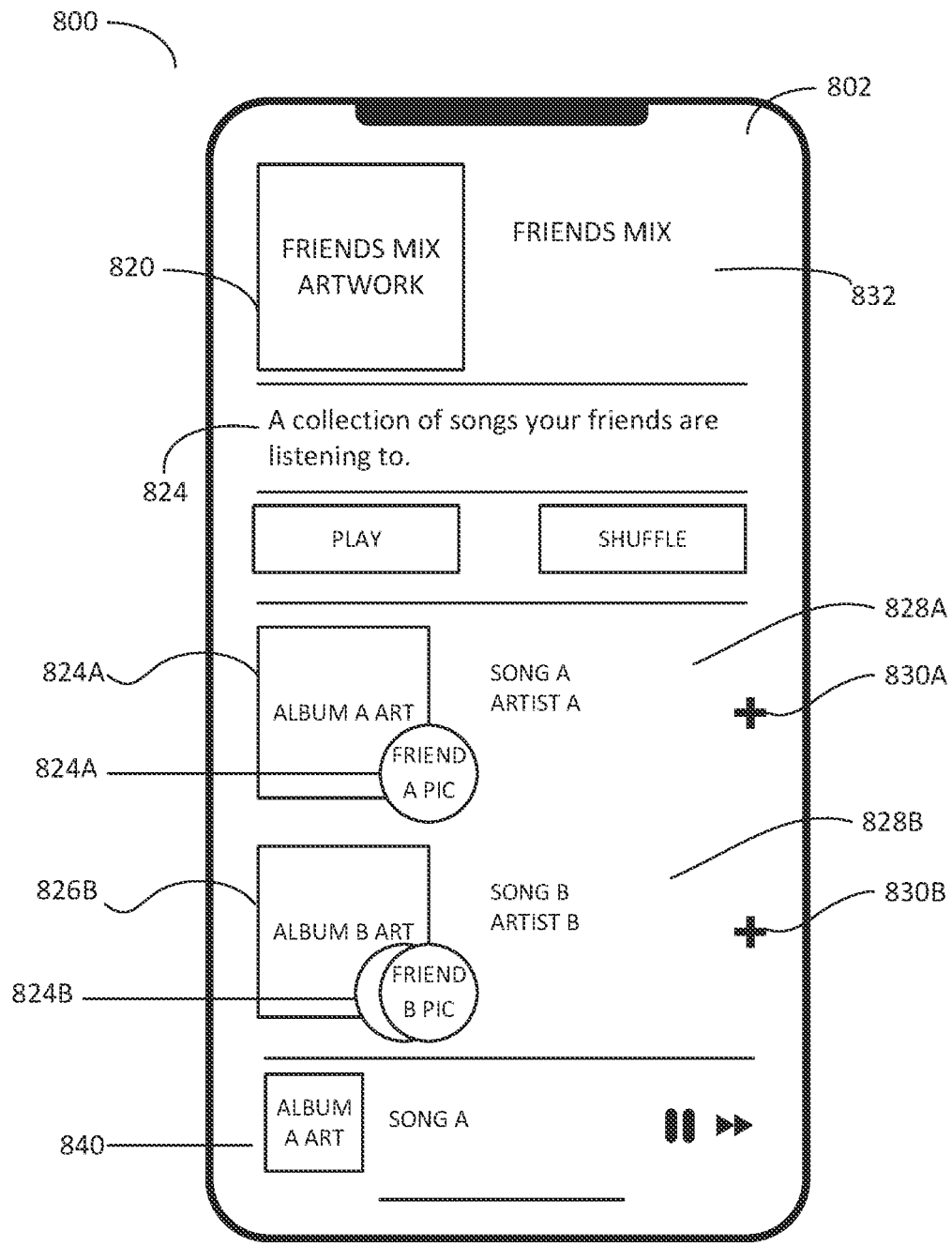
FIG. 8A shows an example graphical user interface in accordance with one or more embodiments.

FIG. 8A shows a first example graphical user interfaces in accordance with one or more embodiments. Specifically, FIG. 8A illustrates a multifunctional device 800 having a touch screen that displays media content, such as within media player 142 of FIG. 1. The media player application displays content browsing user interface 802, which may include a representation of the customized playlist generated in any manner as described above. The content browsing user interface may include a title 632 and a Friends Mix artwork 840 corresponding to the socially-driven customized playlist described herein. The content browsing user interface 802 may also include a description 824, which may describe the playlist in more detail. According to one or more embodiments, the description 824 may also include details such as the last time the playlist was generated, a genre or category for the playlist, and the like.

As described above, the content browsing user interface 802 may include the graphical representation of the song, as shown by 824A and 824B. Thus, the graphical representation of Song A may be Album A Art 824A, which may be an album on which the song was released. Similarly, the graphical representation of Song B may be Album B Art 824B, which may be an album on which the song was released. Each graphical representation of the song 824 may be presented with a graphical indication of a friend account from which the song was obtained. For purposes of the example playlist, the graphical representation of Song A 824A may be badged by a picture of Friend A 824A, who is associated with the friend account form which Song A was obtained for the playlist. Additionally, the graphical representation of Song B 826B may show a multi-friend account indication 824B, with a representative friend account indication visible (e.g., a picture of Friend B). The content browsing user interface 802 may include additional features such as a textual description of each song, as with Song A 828A and Song B 828B. According to one or more embodiments, the textual description may additionally include a reason the song is included in the playlist. For example, the textual description 828 may convey which of the user's friends' listening activity has resulted in the inclusion of a particular song in the playlist.

The content browsing user interface 802 may also include selectable icons 830A and 830B which allow the user to add the song to the user's library, such as a personal library separate from the library described above which is comprised of songs obtained from friend accounts associated with the user account. The content browsing interface 802 may also include an indication of the current song playing, along with play controls, such as a pause button and a skip button, as shown by user consumption interface 840. Thus, the user consumption interface 840 may allow a user to play and navigate through the playlist.

Figure 8B:
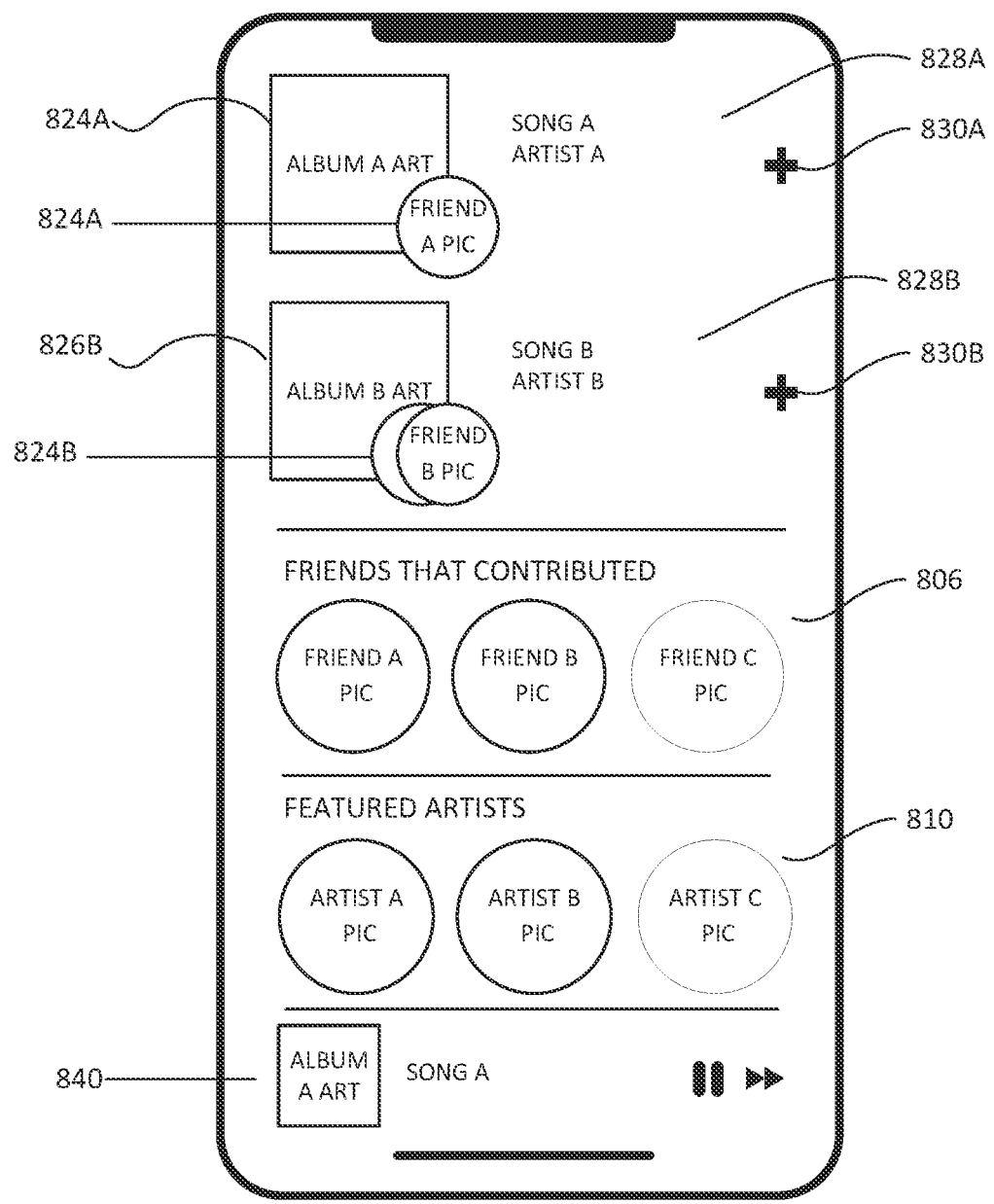
FIG. 8B shows an additional example graphical user interface in accordance with one or more embodiments.

FIG. 8B shows a second example graphical user interfaces in accordance with one or more embodiments. Specifically, FIG. 8B illustrates the multifunctional device 800 having a touch screen that displays media content, such as within media player 142 of FIG. 1. The media player application displays content browsing user interface 802, which may include a representation of the customized playlist generated in any manner as described above. In the example of FIG. 8B, the content browsing user interface 802 additionally includes a friends ribbon, which depicts the graphical indication of friend accounts which contributed to the playlist. Further, the content browsing user interface 802 may also include an artist ribbon 810, which includes graphical indications of artists which contributed to the playlists. The artists may be represented, for example, by graphical representations 824, or by different graphical representations specific to the artists rather than representative of the songs of the playlist.

Figure 9:
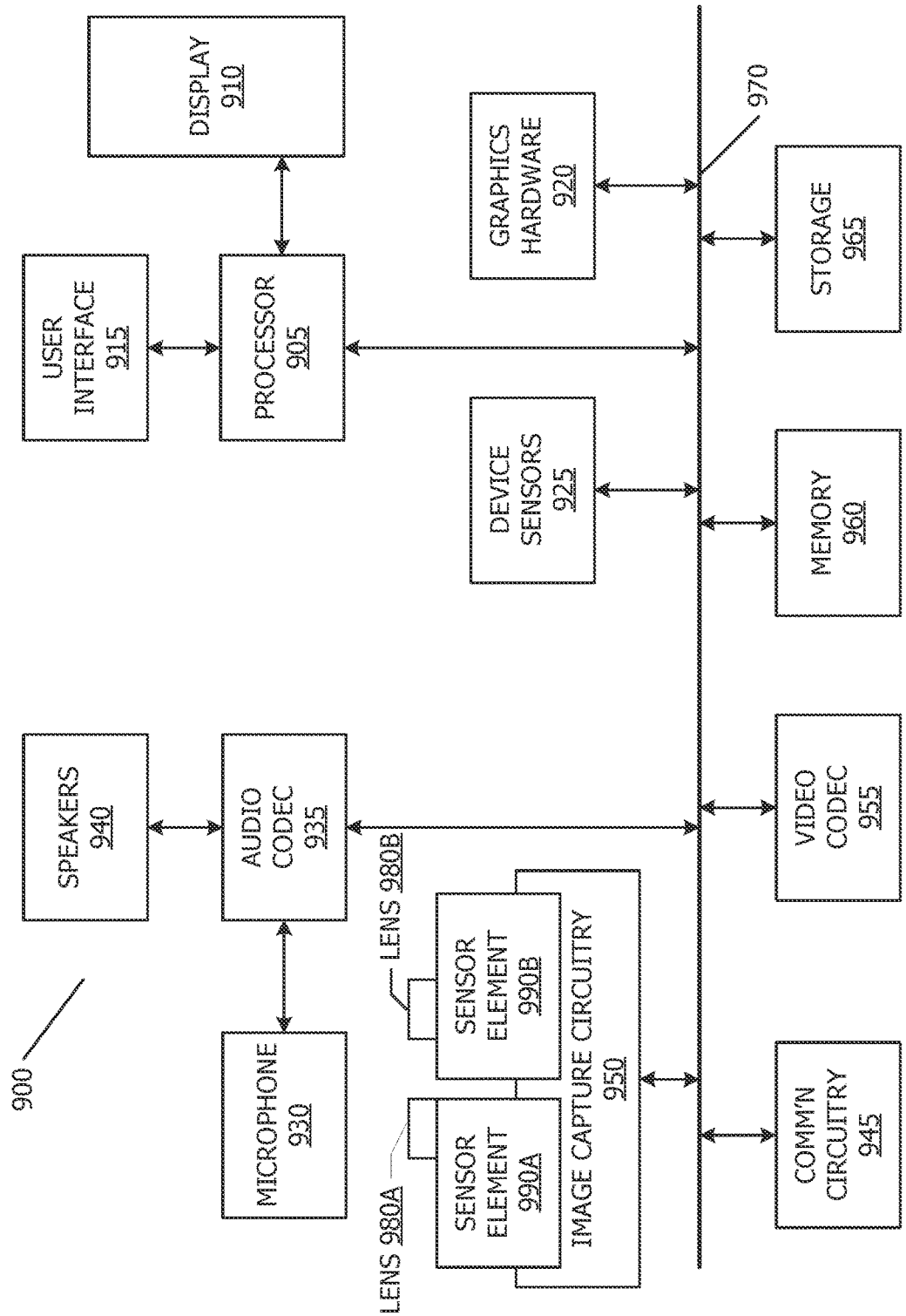
FIG. 9 shows an example system diagram for an electronic device in accordance with one or more embodiments.

Referring now to FIG. 9, a simplified functional block diagram of illustrative multifunction device 900 is shown according to one embodiment. Multifunctional device 900 may show representative components, for example, for devices of media service 100, social media service 120, and client device 140 of FIG. 1. Multifunction electronic device 900 may include processor 905, display 910, user interface 915, graphics hardware 920, device sensors 925 (e.g., proximity sensor/ambient light sensor, accelerometer and/or gyroscope), microphone 930, audio codec(s) 935, speaker(s) 940, communications circuitry 945, digital image capture circuitry 950 (e.g., including camera system) video codec(s) 955 (e.g., in support of digital image capture unit), memory 960, storage device 965, and communications bus 970. Multifunction electronic device 900 may be, for example, a digital camera or a personal electronic device such as a personal digital assistant (PDA), personal music player, mobile telephone, or a tablet computer.

Processor 905 may execute instructions necessary to carry out or control the operation of many functions performed by device 900 (e.g., such as the generation and/or processing of images as disclosed herein). Processor 905 may, for instance, drive display 910 and receive user input from user interface 915. User interface 915 may allow a user to interact with device 900. For example, user interface 915 can take a variety of forms, such as a button, keypad, dial, a click wheel, keyboard, display screen and/or a touch screen. Processor 905 may also, for example, be a system-on-chip such as those found in mobile devices and include a dedicated graphics processing unit (GPU). Processor 905 may be based on reduced instruction-set computer (RISC) or complex instruction-set computer (CISC) architectures or any other suitable architecture and may include one or more processing cores. Graphics hardware 920 may be special purpose computational hardware for processing graphics and/or assisting processor 905 to process graphics information. In one embodiment, graphics hardware 920 may include a programmable GPU.

Image capture circuitry 950 may include two (or more) lens assemblies 980A and 980B, where each lens assembly may have a separate focal length. For example, lens assembly 980A may have a short focal length relative to the focal length of lens assembly 980B. Each lens assembly may have a separate associated sensor element 990. Alternatively, two or more lens assemblies may share a common sensor element. Image capture circuitry 950 may capture still and/or video images. Output from image capture circuitry 950 may be processed, at least in part, by video codec(s) 955 and/or processor 905 and/or graphics hardware 920, and/or a dedicated image processing unit or pipeline incorporated within circuitry 965. Images so captured may be stored in memory 960 and/or storage 965.

Sensor and camera circuitry 950 may capture still and video images that may be processed in accordance with this disclosure, at least in part, by video codec(s) 955 and/or processor 905 and/or graphics hardware 920, and/or a dedicated image processing unit incorporated within circuitry 950. Images so captured may be stored in memory 960 and/or storage 965. Memory 960 may include one or more different types of media used by processor 905 and graphics hardware 920 to perform device functions. For example, memory 960 may include memory cache, read-only memory (ROM), and/or random access memory (RAM). Storage 965 may store media (e.g., audio, image and video files), computer program instructions or software, preference information, device profile information, and any other suitable data. Storage 965 may include one more non-transitory computer-readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 960 and storage 965 may be used to tangibly retain computer program instructions or code organized into one or more modules and written in any desired computer programming language. When executed by, for example, processor 905 such computer program code may implement one or more of the methods described herein.

The scope of the disclosed subject matter should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory computer readable medium comprising computer readable code executable by one or more processors to:
   identify a user account for which a playlist is to be generated, wherein the user account is associated with at least one social profile of a plurality of social profiles;
   identify a subset of the plurality of social profiles corresponding to one or more friend accounts linked to the user account in accordance with a connection between the social profile associated with the user account and the subset of the plurality of social profiles;
   determine an affinity score for each of the one or more friend accounts based on a similarity in taste profile between the user account and the corresponding one or more friend accounts, and a predetermined social relationship between the user account and the corresponding one or more friend accounts, for each friend account;
   generate a library comprising a plurality of songs associated with the subset of the plurality of social profiles;
   weight a relevance score for each of the plurality of songs in the library based on the affinity score for a friend account from which each of the plurality of songs belong, and a number of one or more friend accounts associated with each of the plurality of songs;
   select a subset of the plurality of songs from the library based on the weighted relevance scores; and
   generate the playlist from the selected subset of the plurality of songs.

2. The non-transitory computer readable medium of claim 1, further comprising computer readable code to:
   generate a user interface for the playlist comprising a graphical representation of one or more songs of the playlist with a graphical indication of the one or more friend accounts from which the one or more songs were obtained.

3. The non-transitory computer readable medium of claim 1, further comprising computer readable code to:
   determine the affinity score for each friend account based on relationship data, wherein relationship data includes one or more of account interaction and relationship level indicated by the respective social profiles,
   wherein the plurality of songs is selected from one or more friend accounts associated with an affinity score that satisfies a predetermined threshold.

4. The non-transitory computer readable medium of claim 1, further comprising computer readable code to:
   rank the one or more friend accounts based on their respective affinity scores; and
   select a subset of friend accounts from a top of the ranked one or more friend accounts based on a number of songs associated with the one or more friend accounts constituting a threshold number of songs.

5. The non-transitory computer readable medium of claim 1, wherein the determined affinity scores for friend accounts of family members are weighted more heavily than affinity scores for friend accounts of non-family members.

6. The non-transitory computer readable medium of claim 1, further comprising computer readable code to:
receive a feedback indication for a particular song of the plurality of songs from the user account; and
modify the affinity score for the friend account from which the particular song was obtained based on the feedback indication.

7. A method for generating a playlist, the method, with at least one computing device, comprising:
identifying a user account for which a playlist is to be generated, wherein the user account is associated with at least one social profile of a plurality of social profiles;
identifying a subset of the plurality of social profiles corresponding to one or more friend accounts linked to the user account in accordance with a connection between the social profile associated with the user account and the subset of the plurality of social profiles;
determining an affinity score for each of the one or more friend accounts based on a similarity in taste profile between the user account and the corresponding one or more friend accounts, and a predetermined social relationship between the user account and the corresponding one or more friend accounts, for each friend account;
generating a library comprising a plurality of songs associated with the subset of the plurality of social profiles;
weighting a relevance score for each of the plurality of songs in the library based on the affinity score for a friend account from which each of the plurality of songs belong, and a number of one or more friend accounts associated with each of the plurality of songs;
selecting a subset of the plurality of songs from the library based on the weighted relevance scores; and
generating the playlist from the selected subset of the plurality of songs.

8. The method of claim 7, further comprising:
generating a user interface for the playlist comprising a graphical representation of one or more songs of the playlist with a graphical indication of the one or more friend accounts from which the one or more songs were obtained.

9. The method of claim 7, further comprising:
determining the affinity score for each friend account based on relationship data, wherein relationship data includes one or more of account interaction and relationship level indicated by the respective social profiles,
wherein the plurality of songs is selected from one or more friend accounts associated with an affinity score that satisfies a predetermined threshold.

10. The method of claim 7, further comprising:
ranking the one or more friend accounts based on their respective affinity scores; and
selecting a subset of friend accounts from a top of the ranked one or more friend accounts based on a number of songs associated with the one or more friend accounts constituting a threshold number of songs.

11. The method of claim 7, wherein the determined affinity scores for friend accounts of family members are weighted more heavily than affinity scores for friend accounts of non-family members.

12. The method of claim 7, further comprising:
receiving a feedback indication for a particular song of the plurality of songs from the user account; and
modify the affinity score for the friend account from which the particular song was obtained based on the feedback indication.

13. A system for generating a playlist, comprising:
one or more processors; and
one or more computer readable media comprising computer readable code executable by the one or more processors to:
identifying a subset of the plurality of social profiles corresponding to one or more friend accounts linked to the user account in accordance with a connection between the social profile associated with the user account and the subset of the plurality of social profiles;
determining an affinity score for each of the one or more friend accounts based on a similarity in taste profile between the user account and the corresponding one or more friend accounts, and a predetermined social relationship between the user account and the corresponding one or more friend accounts, for each friend account;
generating a library comprising a plurality of songs associated with the subset of the plurality of social profiles;
weighting a relevance score for each of the plurality of songs in the library based on the affinity score for a friend account from which each of the plurality of songs belong, and a number of one or more friend accounts associated with each of the plurality of songs;
selecting a subset of the plurality of songs from the library based on the weighted relevance scores; and
generating the playlist from the selected subset of the plurality of songs.

14. The system of claim 13, further comprising computer readable code executable by the one or more processors to:
generate a user interface for the playlist comprising a graphical representation of one or more songs of the playlist with a graphical indication of the one or more friend accounts from which the one or more songs were obtained.

15. The system of claim 13, further comprising computer readable code executable by the one or more processors to:
determine the affinity score for each friend account based on relationship data, wherein relationship data includes one or more of account interaction and relationship level indicated by the respective social profiles,
wherein the plurality of songs is selected from one or more friend accounts associated with an affinity score that satisfies a predetermined threshold.

16. The system of claim 13, further comprising computer readable code executable by the one or more processors to:
rank the one or more friend accounts based on their respective affinity scores; and
select a subset of friend accounts from a top of the ranked one or more friend accounts based on a number of songs associated with the one or more friend accounts constituting a threshold number of songs.

17. The system of claim 13, further comprising computer readable code executable by the one or more processors to:
receive a feedback indication for a particular song of the plurality of songs from the user account; and
modify the affinity score for the friend account from which the particular song was obtained based on the feedback indication.

* * * * *